US011324069B2

(12) United States Patent
Bagheri et al.

(10) Patent No.: US 11,324,069 B2
(45) Date of Patent: May 3, 2022

(54) METHODS, DEVICES, AND SYSTEMS FOR DISCONTINUOUS RECEPTION FOR A SHORTENED TRANSMISSION TIME INTERVAL AND PROCESSING TIME

(71) Applicant: Motorola Mobility LLC, Chicago, IL (US)

(72) Inventors: Hossein Bagheri, Urbana, IL (US); Ravikiran Nory, Buffalo Grove, IL (US); Vijay Nangia, Woodridge, IL (US); Ravi Kuchibhotla, Clarendon Hills, IL (US)

(73) Assignee: Motorola Mobility LLC, Chicago, IL (US)

(*) Notice: Subject to any disclaimer, the term of this patent is extended or adjusted under 35 U.S.C. 154(b) by 44 days.

(21) Appl. No.: 16/798,713

(22) Filed: Feb. 24, 2020

(65) Prior Publication Data

US 2020/0196381 A1 Jun. 18, 2020

Related U.S. Application Data

(63) Continuation of application No. 15/633,908, filed on Jun. 27, 2017, now Pat. No. 10,609,758.

(Continued)

(51) Int. Cl.
*H04W 76/28* (2018.01)
*H04W 72/12* (2009.01)
(Continued)

(52) U.S. Cl.
CPC .......... *H04W 76/28* (2018.02); *H04L 1/1883* (2013.01); *H04L 27/2601* (2013.01);
(Continued)

(58) Field of Classification Search
CPC . H04W 76/28; H04W 24/02; H04W 52/0209; H04W 72/042; H04W 72/12; H04W 72/1284; H04W 72/1289; H04W 72/14; H04W 52/0216; H04W 88/02; H04W 88/08; H04L 1/1812; H04L 27/2601; H04L 1/1883; Y02D 70/20; Y02D 70/24; Y02D 70/26; Y02D 70/1224;
(Continued)

(56) References Cited

U.S. PATENT DOCUMENTS

| 2018/0084602 A1* | 3/2018 | Lee | H04L 5/0053 |
| 2019/0045440 A1* | 2/2019 | Wu | H04W 76/28 |
| 2020/0146047 A1* | 5/2020 | Li | H04W 72/1268 |

* cited by examiner

*Primary Examiner* — Kibrom T Hailu
(74) *Attorney, Agent, or Firm* — Loppnow & Chapa

(57) ABSTRACT

A method and apparatus for discontinuous reception for a shortened transmission time interval and processing time includes a device monitoring for data transmission scheduling assignments during an active time of a DRX cycle, and detecting a transmission during the active time. The method further includes the device starting a first timer, in response to the detecting, wherein the first timer is set for a first timer value that specifies an amount of time between detecting the transmission and starting a second timer that extends the active time by a second timer value. The first timer value is determined based on one or both of a selected first TTI length from multiple TTI lengths for which the device can be enabled and/or a selected shorter first processing time over a second processing time associated with a TTI length used by the device.

14 Claims, 14 Drawing Sheets

Related U.S. Application Data

(60) Provisional application No. 62/374,740, filed on Aug. 12, 2016.

(51) Int. Cl.
   *H04L 1/18* (2006.01)
   *H04L 27/26* (2006.01)
   *H04W 24/02* (2009.01)
   *H04W 52/02* (2009.01)
   *H04W 72/04* (2009.01)
   *H04W 72/14* (2009.01)
   *H04W 88/02* (2009.01)
   *H04W 88/08* (2009.01)

(52) U.S. Cl.
   CPC ....... *H04W 24/02* (2013.01); *H04W 52/0209* (2013.01); *H04W 72/042* (2013.01); *H04W 72/12* (2013.01); *H04W 72/1284* (2013.01); *H04W 72/1289* (2013.01); *H04W 72/14* (2013.01); *H04L 1/1812* (2013.01); *H04W 52/0216* (2013.01); *H04W 88/02* (2013.01); *H04W 88/08* (2013.01); *Y02D 30/70* (2020.08)

(58) Field of Classification Search
   CPC .... Y02D 70/142; Y02D 70/146; Y02D 70/00; Y02D 70/12; Y02D 70/1262; Y02D 70/122; Y02D 70/126; Y02D 70/1242; Y02D 70/10
   See application file for complete search history.

200

202
RECEIVE AN INDICATION TO ENABLE A FIRST TRANSMISSION TIME INTERVAL WHICH IS A SHORTER TRANSMISSION TIME INTERVAL THAN A SECOND TRANSMISSION TIME INTERVAL

204
SWITCH FROM MONITORING FOR DATA TRANSMISSION SCHEDULING ASSIGNMENTS UNDER THE CONTROL OF A DISCONTINUOUS RECEPTION CONFIGURATION ASSOCIATED WITH THE SECOND TRANSMISSION TIME INTERVAL TO MONITORING FOR THE DATA TRANSMISSION SCHEDULINGASSIGNMENTS BASED ON THE FIRST TRANSMISSION TIMEINTERVAL

*FIG. 2*

METHODS, DEVICES, AND SYSTEMS FOR DISCONTINUOUS RECEPTION FOR A SHORTENED TRANSMISSION TIME INTERVAL AND PROCESSING TIME

RELATED APPLICATION

The present application is related to and claims benefit under 35 U.S.C. § 119(e) of the U.S. Provisional Patent Application Ser. No. 62/374,740, filed Aug. 12, 2016, titled "Methods, Devices, and Systems for Discontinuous Reception for a Shortened Transmission Time Interval and Processing Time", which is commonly owned with this application by Motorola Mobility LLC, and the entire content of which is incorporated herein by reference.

FIELD OF THE DISCLOSURE

The present disclosure relates generally to wireless communication and more particularly to methods, devices, and systems for discontinuous reception for a shortened transmission time interval length and/or shortened processing time associated with a given transmission time interval length.

BACKGROUND

In Long-Term Evolution (LTE), time-frequency resources can be divided into 1 millisecond (ms) subframes, where each 1 ms subframe includes two 0.5 ms slots, and each slot (with normal cyclic prefix (CP) durations) includes seven single carrier frequency-division multiplexing (SC-FDMA) symbols in the time domain for uplink (UL) communication and seven orthogonal frequency-division multiplexing (OFDM) symbols in the time domain for downlink (DL) communication. In the frequency domain, resources within a slot are divided into physical resource blocks (PRBs), where each resource block spans 12 contiguous subcarriers.

In current LTE systems, resources are usually assigned using a 1 ms minimum transmission time interval (TTI) when data is available for transmission between an eNodeB (eNB) and user equipment (UE). This is referred to as dynamic scheduling. Within each scheduled TTI for UL communication, a UE transmits data over a physical uplink shared channel (PUSCH) in PRB-pairs indicated by an uplink grant to the UE from an eNB that schedules the data transmission. For DL communication, the eNB transmits data over a physical downlink shared channel (PDSCH) in PRB-pairs preceded by a DL assignment from the eNB. The DL assignment information is provided to the UE in a control channel, which is generally referred to as a physical downlink control channel (PDCCH).

Discontinuous reception (DRX) functionality is used in LTE to allow UEs to conserve power. Without DRX, a UE is always awake and continuously monitors all subframes of a PDCCH for DL assignments. With DRX, the UE powers down a portion of its circuitry during a DRX sleep mode when there are no expected data packets to be received. The eNB configures DRX with a set of DRX parameters shared with the UE. These DRX parameters can be application dependent such that power and resource savings are maximized. The eNB then schedules DL assignments during periods when the UE is actively monitoring for them.

While DRX operation results in power savings, it comes at the expense of latency. On average, a UE using DRX receives transmissions later as compared to when DRX is not used. This delay can be problematic when the transmissions are associated with a time-sensitive application executing on the UE.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 shows a logical flow diagram illustrating a method for monitoring for data transmission scheduling assignments based on a shortened TTI in accordance with some embodiments.

Figure 1:
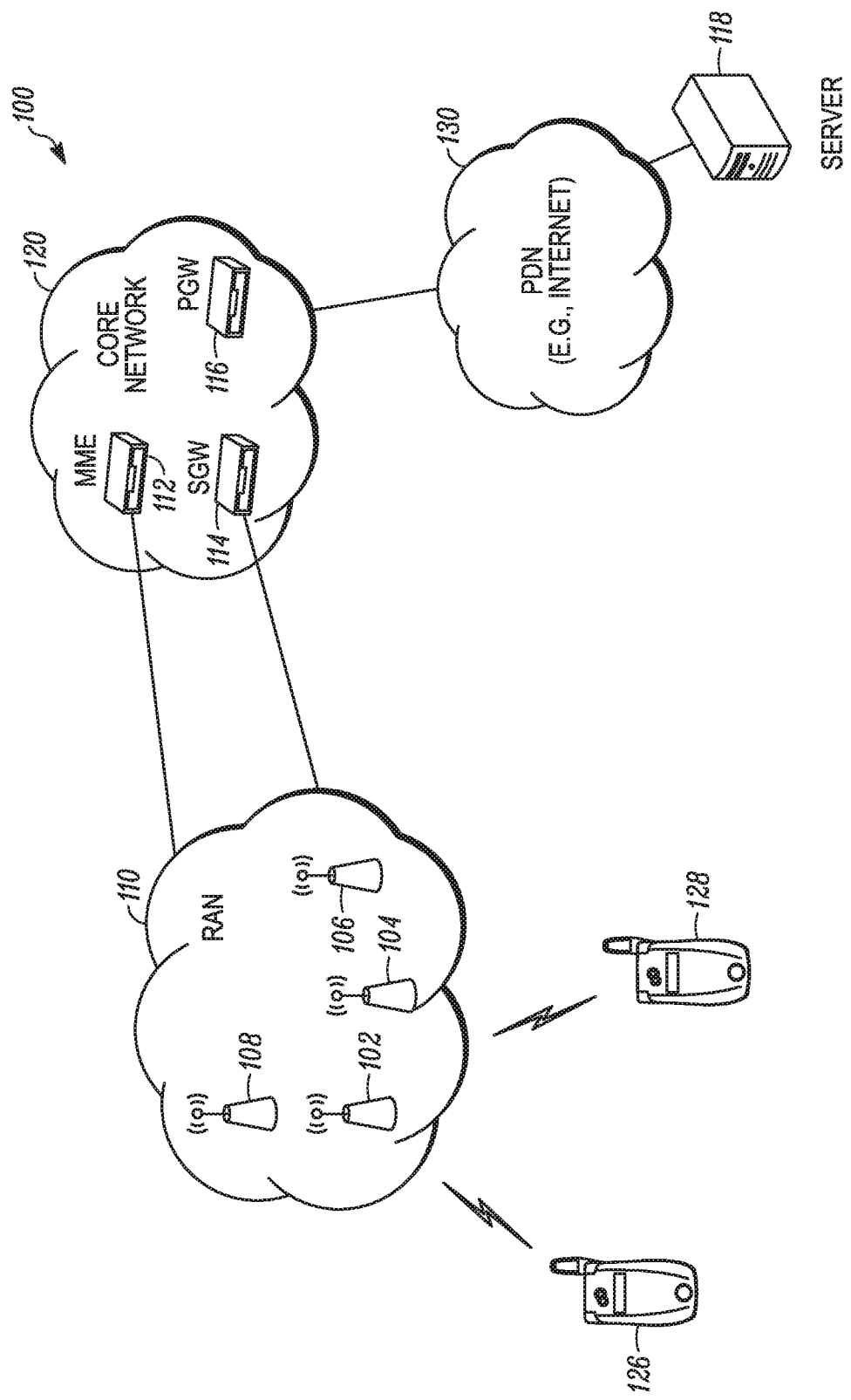
FIG. 1 shows a schematic diagram illustrating an environment that supports discontinuous reception for a shortened TTI length and/or a shortened processing time associated with a given TTI length in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides methods, devices, and systems for DRX utilizing a shortened TTI (sTTI) length and/or shortened processing time, associated with a given (longer) TTI length, in a mobile communication network. The mobile communication network includes at least one access network, such as an LTE network. At least some UEs are capable of operating in the access network using multiple TTI lengths, wherein at least one of those lengths is a sTTI length relative to a longer TTI length.

For additional embodiments, UEs are capable of operating using a shortened processing time while using a TTI of longer length to receive transmissions. When operating in a DRX mode configured using DRX parameters associated with the sTTI length and/or the shortened processing time associated with the longer TTI length, the UE can more efficiently monitor for data transmission scheduling assignments while still realizing the power savings of operating in the DRX mode.

A data transmission scheduling assignment, or a scheduling assignment for a data transmission, is a transmission a UE receives from an eNB of an access network that provides information and/or allocates resources to the UE to enable the UE to receive a data transmission from the eNB. For example, a data transmission scheduling assignment indicates a PRB and demodulation scheme for a DL data transmission intended for the UE.

The words "monitor" and "scan" are used interchangeably and refer to a UE "listening" or "watching" for an incoming wireless transmission. For example, the UE listens or watches for an incoming transmission on a PDCCH over a predetermined time period.

In accordance with the teachings herein, a method performed by a device includes the device receiving from a network an indication to enable a first TTI which is a shorter TTI than a second TTI for which the device can be enabled. The method further includes the device switching from monitoring for data transmission scheduling assignments under the control of a DRX configuration associated with the second transmission time interval to monitoring for the data transmission scheduling assignments based on the first transmission time interval.

Also in accordance with the teachings herein is a device having a communication interface and a processor operatively coupled together to receive, from a network, an indication to enable a first transmission time interval which is a shorter transmission time interval than a second transmission time interval for which the device can be enabled. The operatively coupled communication interface and processor additionally switch from monitoring for data transmission scheduling assignments under the control of a DRX configuration associated with the second transmission time interval to monitoring for the data transmission scheduling assignments based on the first transmission time interval.

For some embodiments, the first TTI has a shorter length than the second TTI. In other embodiments, the first TTI has a same length as the second TTI but is associated with a shorter data transmission processing time than a data transmission processing time associated with the second TTI. In further embodiments, the first TTI both has a shorter length than the second TTI and is associated with a shorter data transmission processing time than for the second TTI. The term "shorter" when contrasting one TTI against another longer TTI, for instance, can indicate that the shorter TTI is shorter in time and/or that a data transmission received over the course of the shorter TTI is processed more quickly as compared to a similar data transmission received over the course of the longer TTI. Data transmission processing time is described in detail infra with reference to FIGS. 10 and 11.

In accordance with the teachings herein, a method performed by a device includes the device monitoring for data transmission scheduling assignments during an active time of a DRX cycle, and detecting a transmission during the active time. The method further includes the device starting a first timer, in response to the detecting, wherein the first timer is set for a first timer value that specifies an amount of time between detecting the transmission and starting a second timer that extends the active time by a second timer value. The first timer value is determined based on one or both of a selected first TTI length from multiple TTI lengths for which the device can be enabled and/or a selected shorter first processing time over a second processing time associated with a TTI length used by the device. For some embodiments, one or both of the first TTI length or the first processing time is selected based on an indication from a network.

Also in accordance with the teachings herein is a device having a communication interface and a processor operatively coupled together to monitor for data transmission scheduling assignments during an active time of a discontinuous reception cycle and detect a transmission during the active time. The operatively coupled communication interface and processor additionally start a first timer, in response to the detection, wherein the first timer is set for a first timer value that specifies an amount of time between the detection of the transmission and starting a second timer that extends the active time by a second timer value. The operatively coupled communication interface and processor determine the first timer value based on one or both of a selected first transmission time interval length from multiple transmission time interval lengths for which the device can be enabled or a selected shorter first processing time over a second processing time associated with a transmission time interval length used by the device.

In described embodiments, the aforementioned devices are referred to as UEs, which send and receive data using a wireless communication network, such as a high-speed mobile communication network using the LTE standard of operation. UEs can include, as later described, smartphones and other electronic data devices, like phablets and tablets, having cellular capability.

A TTI refers to a time interval for which a radio resource is allocated to a UE. As used herein, a TTI has associated therewith an allocated time duration or "length" and a UE and or eNB processing time duration or simply processing time. Accordingly, a first TTI that is "shorter" than a second TTI could mean, for example, that the first TTI has a shorter length than the second TTI or that the first and second TTIs have the same length but the first TTI has a shorter associated UE processing time than the second TTI.

For brevity and clarity in describing some presented embodiments, a first TTI, which is shorter than a second TTI in length, is also referred to herein as an "sTTI" for "short TTI." The second TTI of longer length is, thereby, referred to as a "LTTI" for "long TTI," which for some embodiments conforms with current LTE standards for a TTI. For example, an LTTI is 1 ms (i.e., one subframe) in length while an sTTI is 0.5 ms (i.e., one slot) in length. In another embodiment, the length of the sTTI is such that it supports the transmission of two OFDM symbols, or approximately 140 microseconds (μs) in length. For other embodiments the sTTI has any length in terms of time or number of transmitted symbols subject to the condition that the sTTI is of lesser length than the LTTI. In a particular embodiment, an LTTI is fourteen symbols in length and an sTTI is two symbols in length.

Enabling or activating a feature, such as sTTI, on a device means to begin using a certain feature or setting and may include changing a configuration, if another configuration is currently being used, or setting a status or flag in the device. Disabling or deactivating a feature on a device means to stop using the feature. Configuring a device means to make changes within the device based on a set of parameters stored within the device and/or provided to the device in order to enable a certain feature or setting.

FIG. 1 illustrates a schematic diagram of an example environment 100 within which may be implemented methods and devices for DRX for a shortened TTI length and/or shortened processing time, in accordance with the present teachings. As illustrated, the environment 100 includes: a mobile communication network having an access network 110, which in this case is a radio access network (RAN); a core network 120; a packet data network (PDN) 130; and two mobile devices, namely UEs 126 and 128.

The core network 120 includes multiple types of network elements that are collectively used for the overall control of managing the connectivity and location of UEs and managing bearers for communication within the mobile communication network. Bearers are logical data paths within the mobile communication network with specific quality of service (QoS) properties. The distribution of functions between the multiple types of network elements of the core network 120 depends on a particular system architecture, as defined, for instance, by a set of protocols implemented in the mobile communication network.

The RAN 110 includes one or more base stations, which are collectively used to provide over-the-air connectivity for mobile devices, communicatively linking them to the core network 120. The UEs 126 and 128 are representative of a variety of mobile devices including, for example, cellular telephones, personal digital assistants (PDAs), smartphones, laptop computers, tablets, phablets, or other handheld or portable electronic devices.

The RAN 110 can use any type of radio access technology (RAT) for mobile devices to access and communicate using the mobile communication network. The access network 110 can be a cellular access network, having at least one cellular tower or base station for facilitating the establishment of wireless links by one or more mobile devices to the access network. Any suitable cellular or cellular-based access technology can be used. Such technologies include, but are not limited to: an analog access technology such as Advanced Mobile Phone System (AMPS); a digital access technology such as Code Division Multiple Access (CDMA), Time Division Multiple Access (TDMA), Global System for Mobile communication (GSM), integrated Digital Enhanced Network (iDEN), General Packet Radio Service (GPRS), Enhanced Data for GSM Evolution (EDGE), etc.; and/or a next generation access technology such as Universal Mobile Telecommunication System (UMTS), Wideband CDMA (WCDMA), etc.; or variants thereof.

The PDN 130 can be, for instance, an enterprise network, an Internet Protocol (IP) Multimedia Subsystem (IMS), the Internet, etc., which has at least one server, e.g., server 118. For a particular embodiment, the PDN 130 represents a system of interconnected computer networks that use the standard Transmission Control Protocol (TCP)/IP suite. One example computer network is a network operated by a media service provider, which includes one or more media servers, e.g., a media server 118. The media server 118 stores and shares media or content including, but not limited to, videos such as YouTube videos or movies, audio such as music, picture files, or other static and/or dynamic content, some of which can be HD media.

Additionally, although not shown, environment 100 can further include other networks coupled to and supported by the core network 120 and accessible to the UEs 126, 128. Such networks can include, for example, one or more additional PDNs or one or more Wireless Local Area Networks (WLANs). The WLANs have at least one access point for facilitating wireless links using, for instance, Institute of Electrical and Electronics Engineers (IEEE) 802.11 standards, also referred to in the art as Wi-Fi technology, or using Worldwide Interoperability for Microwave Access (WiMax) technology.

For particular embodiments described herein with respect to FIGS. 2 through 14, the mobile communication network is a 3rd Generation Partnership Project (3GPP) network, for instance, an LTE network, wherein the network elements and the mobile devices are configured to operate and communicate in accordance with and consistent with one or more 3GPP standards or technical specifications (TS), for instance the LTE specifications or the NexGen or 5G specifications. However, this communication environment 100 implementation is meant only to serve as an example and in no way limit the disclosed embodiments, which might alternatively be implemented using other types of network deployments and associated communication protocols. Additionally, although only UEs are referenced in the FIGS. 2 through 14, the teachings can be extended to other types of mobile devices establishing connections and communicating within the environment 100.

For the illustrated 3GPP network embodiment 100, the RAN network 110 is an Evolved UMTS Terrestrial Radio Access Network (E-UTRANs) having at least one base station, in this case four eNBs, namely eNB 102, eNB 104, eNB 106, and eNB 108. The base stations serve mobile devices, such as the UEs 126 and 128, by connecting the mobile devices to the core network 120 and establishing access network bearers for the mobile devices. Alternatively, the RAN 110 is a legacy UTRAN having at least one eNB. Additionally, although not shown, the RAN 110 can have multiple segments connected by one or more RAN routers, with each RAN segment forming a different IP routing domain. Accordingly, all the mobile devices connected to the same RAN segment are allocated IP addresses from the same address space. The core network 120, which serves the RAN 110, is a System Architecture Evolution (SAE) core, also referred to in the art as an Evolved Packet Core (EPC). The EPC subcomponents include a Mobility Management Entity (MME) 112, a Serving Gateway (SGW) 114, a PDN Gateway (PGW) 116, and other subcomponents not shown, such as a Home Subscriber Server (HSS), etc.

Accordingly, functionality and message exchanges to facilitate the teachings herein can be implemented with protocols used in 3GPP networks. Such protocols can include, but need not be limited to, Non-Access Stratum (NAS) protocols running between the mobile devices and the core network and Access Stratum (AS) protocols running between the mobile devices and the eNBs of which Radio Resource Control (RRC) is an example AS protocol, etc.

Some NAS and AS protocols are defined, for instance, in 3GPP TS 23.401. However, in other embodiments, proprietary protocols can be used alternative to or in addition to standard protocols in order to carry out the present teachings. The particular protocols used, either proprietary or standard, can depend at least in part on the particular network architecture.

FIG. 2 shows a logical flow diagram illustrating a method 200 for monitoring for data transmission scheduling assignments based on a shortened TTI in accordance with some embodiments. The UE 126, for example, receives 202 an indication to enable a first TTI, or sTTI, which is a shorter transmission time interval than a second TTI, or LTTI, for which a device can be enabled. The UE 126 then monitors 204 for data transmission scheduling assignments based on the sTTI instead of under the control of a DRX configuration associated with the LTTI. For example, the UE 126 switches 204 from monitoring for data transmission scheduling assignments under the control of a discontinuous reception configuration associated with the LTTI to monitoring for the data transmission scheduling assignments based on the sTTI. In one embodiment, the sTTI includes a first set of OFDM symbols, and the LTTI includes a second set of OFDM symbols. In another embodiment, the UE 126 monitoring data transmission scheduling assignments includes the UE 126 attempting to decode the data transmission scheduling assignments. The method 200 is described in greater detail with reference to FIGS. 3 through 8.

Figure 3:
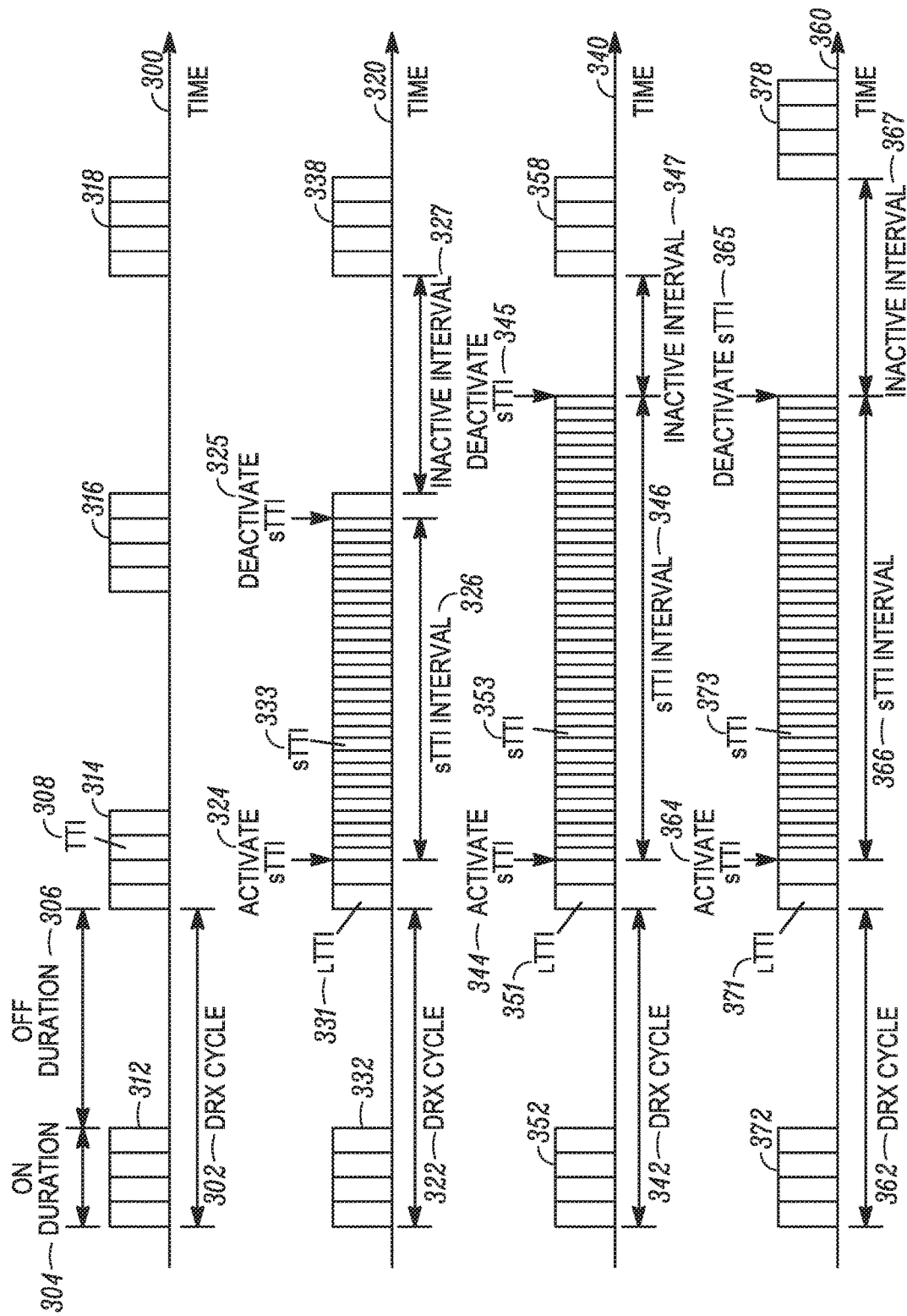
FIG. 3 shows time sequence diagrams illustrating DRX operation utilizing both TTIs and shortened TTIs in accordance with some embodiments.

FIG. 3 illustrates DRX operation on a UE utilizing both LTTI and sTTI in accordance with some embodiments. These and other embodiments are described herein by reference to the UE 126 with the understanding that similar embodiments involve other devices or other combinations of devices configured to operate using a wireless network such as that shown by environment 100. In particular, FIG. 3 shows four timelines 300, 320, 340, and 360, each illustrating a different embodiment for DRX operation.

Timeline 300 shows DRX operation with a 1 ms TTI length only, as indicated at 308, consistent with existing art. A DRX cycle 302 begins with an on duration 304. During the on duration 304, the UE 126 actively monitors a PDCCH established with an eNB of the RAN 110, taken to be the eNB 102. The UE 126 monitors for the length of each TTI of a block 312 of TTIs which spans the on duration 304. During this time, the UE 126 monitors the PDCCH for a data transmission scheduling assignment sent by the eNB 102. The PDCCH carries DL control information (DCI), which via the scheduling assignment indicates to the UE 126 when to monitor a PDSCH established with the eNB 102 for a DL data transmission.

The DRX cycle 302 ends with an off duration 306. As used herein, the term "off duration" represents an opportunity for DRX in that the off duration can be converted into active scanning time based on DRX timers. The remainder of the DRX cycle 302 represents an opportunity for DRX because the UE 126 can actively monitor the PDCCH during this interval if triggered to do so, such as if a DRX inactivity timer is still running at the end of the on duration 304. As shown, the UE 126 is not actively monitoring the PDCCH during the off duration 306. This is to maintain brevity and simplicity in describing enclosed embodiments.

With blocks 314, 316, and 318 of contiguous TTIs 308, the DRX cycle 302 repeats itself. In each case, an on duration, represented by an illustrated TTI block, is followed by an accompanying off duration. The resulting discontinuous monitoring of the PDCCH by the UE 126 allows the UE 126 to realize reduced power utilization, resulting in extended battery life. The eNB 102 is synced in its timing with the UE 126 so that data transmission scheduling assignments sent by the eNB 102 are received by the UE 126 during an on duration. This is achieved, for example, by sharing configuration parameters for the DRX cycle 302 between the UE 126 and the eNB 102.

As specified by the 3GPP; Technical Specification Group Radio Access Network; Evolved Universal Terrestrial Radio Access; Medium Access Control Protocol Specification; Release 14 (TS 36.321 V14.0.0), different DRX parameters define and control different aspects of a DRX cycle. A DRX Start Offset parameter, for instance, specifies a subframe at which a DRX cycle begins. A DRX Cycle parameter specifies the duration of the DRX cycle in subframes, and a DRX On-Time specifies the duration of the on-time for the DRX cycle in subframes. In accordance with existing art, a single subframe has the same length as the TTI 308, namely 1 ms.

In some instances, DRX operation includes both short and long DRX cycles for a given TTI. As a time since a last transmission was received increases beyond a threshold time, for example, a UE experiences deeper sleep in that the off duration for the long DRX cycle is greater than the off duration for the short DRX cycle. A Short DRX Cycle parameter, for instance, specifies a number of PDCCH subframes in the short DRX cycle, and a Long DRX Cycle parameter specifies a number of PDCCH subframes in the long DRX cycle. Additionally, a DRX short Cycle Timer parameter might specify a number of subframes a short DRX cycle repeats before transitioning to a long DRX cycle, assuming no transmissions are received.

Timelines 320, 340, and 360 illustrate, in part, innovation of the present teachings and are referenced and contrasted against timeline 300 in describing embodiments of some presented claims. In the timelines 320, 340, and 360, the UE 126 transitions from LTTI to sTTI, at times 324, 344, and 364, respectively, in monitoring a sPDCCH for data transmission scheduling assignments. In one group of embodiments, LTTIs 331, 351, and 371 are of the same time length as the TTI 308, namely 1 ms. In other groups of embodiments, the LTTIs 331, 351, and 371 are of longer or shorter length than the TTI 308 while being longer in length then sTTIs 333, 353, and 373, respectively. For illustrated embodiments, LTTIs 331, 351, and 371 are of the same length as the TTI 308. Further, DRX cycles 322, 342, and 362 are of the same length as the DRX cycle 302, sharing both the same on 304 and off 306 durations and start time. The LTTI blocks 332, 352, and 372 are shown in time synch with the TTI block 312 to simplify describing presented embodiments.

For timeline 320, the LTTI 331 is the TTI with which the UE 126 is enabled upon initially connecting to a network. The UE 126, for example, powers on and connects with a wireless communication network, such as an LTE network. The UE 126 then monitors a PDCCH, or an enhanced PDCCH (EPDCCH), for data transmission scheduling assignments using the LTTI 331. As shown, the UE 126 begins DRX operation for the LTTI 331 as illustrated by the DRX cycle 322. The span of the LTTI block 332 represents the on duration of the DRX cycle 322. As illustrated, the LTTI blocks 332 and 338 are in time alignment with TTI blocks 312 and 318, respectively. For one embodiment, the network determines a set of DRX parameters for the LTTI 331 and communicates the parameters to the UE 126. For example, the eNB 102 sends the DRX configuration parameters under a DRX config structure under MAC-MainConfig. In another embodiment, the UE 126 determines the set of DRX parameters and communicates those parameters to the eNB 102.

When the UE 126 launches an application which can benefit from low-latency wireless communication, such as a peer-to-peer gaming application or a financial trading application, the UE 126 activates 324 a low-latency mode by transitioning from the LTTI 331 to the sTTI 333. Under the sTTI 333, as shown, the UE 126 continuously monitors for data transmission scheduling assignments. Continuously monitoring means that there are no periods of inactivity during which the UE 126 is not scanning a physical downlink control channel, such as a PDCCH, EPDCCH, LPDCCH, or sPDCCH, for data transmission scheduling assignments. This is illustrated for the timeline 320 by the appearance of the contiguous sTTIs 333 for an sTTI interval 326 between the sTTI 333 activation time 324 and an sTTI 333 deactivation time 325. Periods of scanning inactivity, such as the off duration for the DRX cycle 322, represent times for which reception of a data transmission scheduling assignment by the UE 126 is delayed at least until the next active scanning interval. By continuously scanning during sTTI utilization, latency is further reduced as compared to using DRX.

For some embodiments, the UE 126 continuously monitoring for data transmission scheduling assignments is preceded by the UE 126 disabling DRX functionality. Disabling DRX functionally means, for instance, that the UE 126 suspends discontinuous scanning and may include reconfiguring the UE 126 and/or setting a flag to disable the DRX functionality. In some instances, DRX functionality is resumed or reinitialized based on an already implemented set of DRX configuration parameters, such as by reconfiguring the UE 126 with the already implemented set of DRX configuration parameters or otherwise enabling the already implemented set of DRX configuration parameters. In other instances, DRX functionality is resumed or reinitialized based on a new set of DRX configuration parameters.

In the timelines 320 and 340, for example, DRX functionality for LTTI is resumed based on an already implemented set of LTTI DRX configuration parameters. This is illustrated by the LTTI blocks 338 and 358 being in time alignment with the TTI block 318. During the sTTI 333 interval 326 for timeline 320 and sTTI 353 interval 346 for timeline 340, a clock of the UE 126 continues to track time for implemented DRX parameters while DRX functionality is suspended. When DRX functionality is resumed with the deactivation of sTTI, on and off durations align with the same intervals they would have had if the DRX functionality had been continued without interruption.

The deactivation 325 of sTTI 333 in timeline 320, for example, occurs before the on duration represented by the TTI block 316 ends. The UE 126 therefore transitions to actively scanning with LTTI 331 until the on duration ends. This is followed by an inactive interval 327 before the UE 126 resumes LTTI 331 scanning for the LTTI block 338. Here, the inactive interval 327 represents the off duration of the LTTI 331 DRX cycle.

Deactivation 345 of the sTTI 353 in timeline 340 occurs after the on duration represented by the TTI block 316 ends. The UE 126 therefore transitions to an inactive interval 347 shorter than the off duration of the LTTI 351 DRX cycle before resuming active scanning for the LTTI block 358 representing the next on duration.

For timeline 360, disabling DRX functionality when activating 364 the sTTI 373 includes disabling the DRX configuration associated with the LTTI 371. DRX scanning for the LTTI 371 is then reinitialized based on the same or a new set of DRX configuration parameters after the sTTI 373 scanning is deactivated 365. For the embodiment shown, sTTI 373 scanning is continuous over an sTTI 373 interval 366. Because DRX scanning is reinitialized, LTTI block 378, representing an on duration, is not shown in time alignment with the TTI block 318 or the LTTI blocks 338 or 358. When DRX scanning is reinitialized with the same DRX configuration parameters used previously, inactive interval 367 is of the same duration as the off interval for DRX cycle 362. When DRX scanning is reinitialized with a different set of DRX configuration parameters, the inactive interval 367 can be of a different duration than the off interval for DRX cycle 362.

In one embodiment, the UE 126 receives an indication to disable the sTTI 373 at 365 from the network. The indication, for example, is transmitted by the eNB 102. The UE 126 then monitors for data transmission scheduling assignments under the control of a DRX configuration associated with the LTTI 371. For a further embodiment, the UE 126 also receives an indication to again enable LTTI 371 scanning from the network.

In a case for which sTTI is configured, for example, via RRC, or activated, for example, via a medium access control (MAC) control element (CE), the already configured DRX cycle may be disabled since configuring/activating sTTI is usually associated with low-latency operation and DRX operation generally introduces additional latency.

For some embodiments, different on-durations are used before and after sTTI being enabled. For example, more active time is provided to reduce latency by increasing an on-duration timer. In another example, the UE 126 uses different DRX Short Cycle Timers before and after sTTI being enabled. For instance, a higher value for the DRX Short Cycle Timer can be used after sTTI is enabled.

Figure 4:
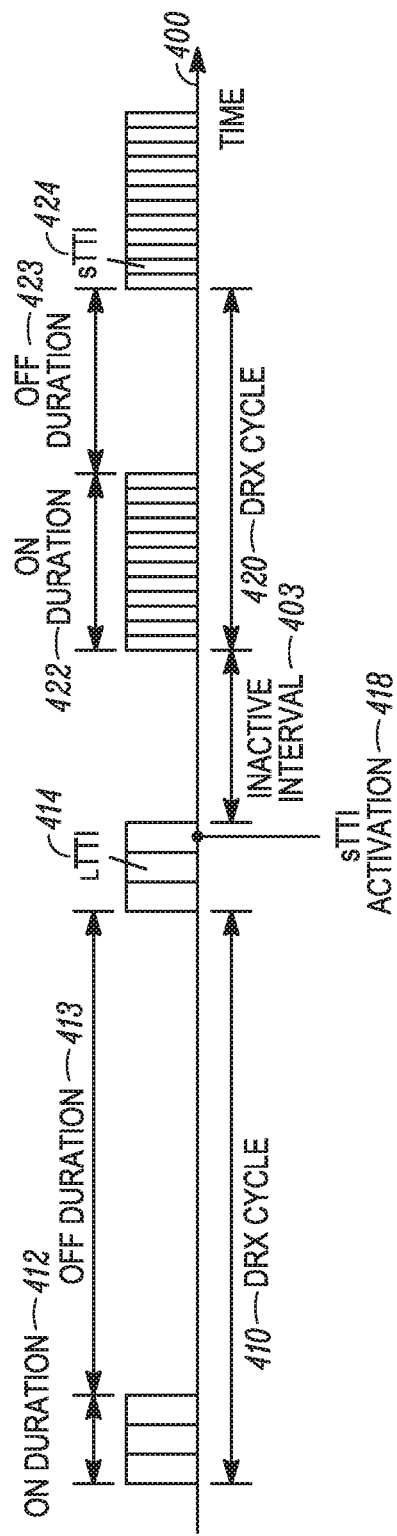
FIG. 4 shows a time sequence diagram illustrating DRX operation utilizing both TTIs and shortened TTIs in accordance with an embodiment.

FIG. 4 shows a time sequence diagram of a UE monitoring for data transmission scheduling assignments using both LTTI 414 and sTTI 424 at different times. Here, scanning under the sTTI 424 is no longer continuous as it was for embodiments described with reference to FIG. 3. Both LTTI 414 and sTTI 424 scanning are configured for independent LTTI 410 and sTTI 420 DRX cycles. As shown on timeline 400, the DRX cycle 410 is associated with configuration parameters resulting in an on duration 412 and an off duration 413. Whereas, the DRX cycle 420 is associated with configuration parameters resulting in an on duration 422 and an off duration 423.

sTTI activation occurring at 418 results from the UE 126 receiving an indication from the eNB 102. In another embodiment, the UE 126 transitions from LTTI 414 scanning to sTTI 424 scanning as a result of a particular application, which benefits from low-latency wireless communication, launching on the UE 126. In one instance, active LTTI 414 scanning transitions directly to sTTI 424 scanning. As shown for timeline 400, sTTI 424 activation 418 is followed by an inactive interval 403 before active sTTI 424 scanning occurs for the on duration 422 of the DRX cycle 420. For a particular embodiment, the duration of the inactive interval 403 is the same as for the off duration 423 of the DRX cycle 420.

In one embodiment, the sTTI 424 is associated with a first DRX configuration, and the LTTI 414 is associated with a second DRX configuration, wherein the first and second DRX configurations include different DRX parameters. The UE 126 enables the first DRX configuration using the associated DRX parameters to control monitoring for data transmission scheduling assignments based on the sTTI 424.

For another embodiment, the UE 126 disables the second DRX configuration before enabling the first DRX configuration.

In a further embodiment, the first DRX configuration provides a longer active time for monitoring for the data transmission scheduling assignments than the second DRX configuration. Active time is a time related to DRX operation, during which the MAC entity monitors the scheduling assignment (e.g. PDCCH). The same Active Time can apply to all activated serving cell(s). For example, the DRX parameters for the first DRX configuration includes a first on-duration timer value, and the DRX parameters for the second DRX configuration includes a second on-duration timer value, so that the longer active time is due at least in part to the first on-duration timer value being larger than the second on-duration timer value. This results in the sTTI 424 on duration 422 being longer than the LTTI 414 on duration 412. With a longer on duration 422, there is a greater probability that the UE 126 will receive a data transmission scheduling assignment while actively scanning without having to wait until the next on duration.

In an additional embodiment, the off duration 423 for sTTI 424 scanning is shorter than the off duration for LTTI 414 scanning. This further reduces latency as the UE 126 monitors for data transmission scheduling assignments using the sTTI 424.

The UE 126 can receive a first set of DRX parameters for the first DRX configuration for sTTI 424 scanning and a second set of DRX parameters for the second DRX configuration for LTTI 414 scanning from the network before receiving the indication to enable sTTI 424 scanning. The UE 126, accordingly, selects sTTI 424 scanning and configures itself using the first set of DRX parameters after receiving the indication to enable sTTI 424 scanning, to enable the first DRX configuration.

The UE 126 can also receive a second set of DRX parameters for the second DRX configuration for LTTI 414 scanning from the network before receiving the indication to enable sTTI 424. The UE 126 receives a first set of DRX parameters for the first DRX configuration for sTTI 424 scanning from the network at the time of or after receiving the indication to enable the sTTI 424 scanning, wherein the first DRX parameters are used to enable the first DRX configuration.

For another embodiment, the UE 126 also monitors for data scheduling assignments corresponding to LTTI in subframes when the UE 126 monitors for data scheduling assignments corresponding to sTTI. For example, the UE 126 uses both the LTTI 414 and the sTTI 424 for monitoring during the on duration 422.

Figure 5:
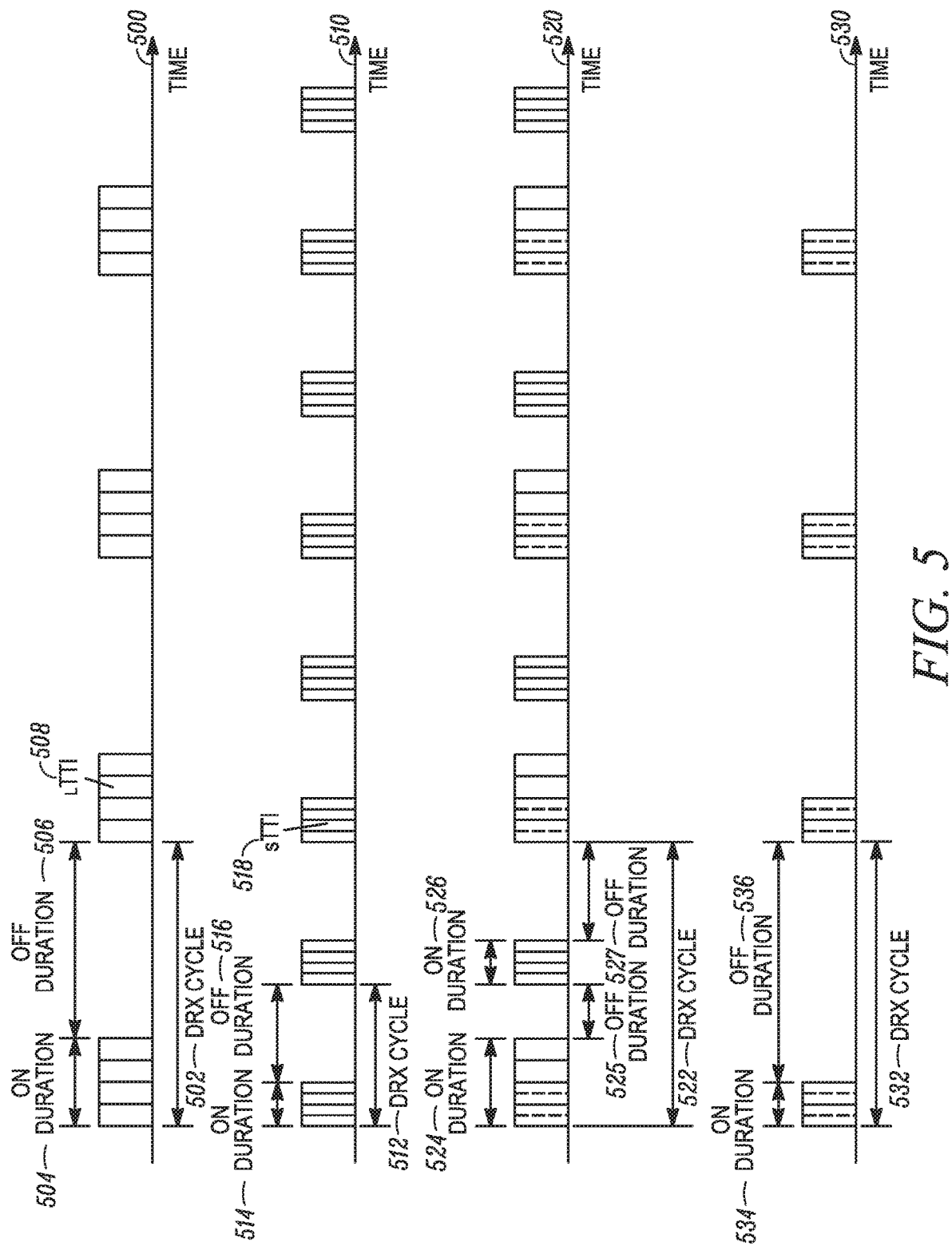
FIG. 5 shows time sequence diagrams illustrating DRX operation utilizing both TTIs and shortened TTIs in accordance with some embodiments.

FIG. 5 shows four timelines 500, 510, 520, 530 collectively illustrating the combining of two separate DRX cycles 502, 512 into a third DRX cycle, 522 or 532, which governs the UE 126 monitoring for data transmission scheduling assignments. sTTI 518 of the timeline 510 is associated with a first DRX configuration that represents the DRX cycle 512 having an on duration 514 and an off duration 516. LTTI 508 of the timeline 500 is associated with a second DRX configuration that represents the DRX cycle 502 having an on duration 504 and an off duration 506. In a particular embodiment, the LTTI 508 is 1 ms in length. The first and second DRX configurations include different DRX parameters, resulting in the DRX cycles 502 and 512 having different on and off durations. The UE 126 determines a third DRX configuration based on the first and second DRX configurations. It is the third DRX configuration that controls the UE 126 monitoring for data transmission scheduling assignments based on both the sTTI 518 and the LTTI 508.

The UE 126 determines the third DRX configuration by determining a union of at least one of the DRX parameters of the first and second DRX configurations. For one embodiment, determining a union of at least one of the DRX parameters of the first and second DRX configurations includes the UE 126 determining a union of a first active time for monitoring for the data transmission scheduling assignments and a second active time for monitoring for the data transmission scheduling assignments, wherein the first active time is provided by the first DRX configuration and the second active time is provided by the second DRX configuration.

The union of the on durations 504 and 514 results in an on duration 524, one of two on durations in the DRX cycle 522. Because the on duration 504 is associated with an expectation of receiving a scheduling assignment using the LTTI 508, and the on duration 514 is associated with an expectation of receiving a scheduling assignment using the sTTI 518, the UE 126 scans for both types of scheduling assignments during the on duration 524 by using both the LTTI 508 and the sTTI 518, as indicated by dotted lines. Less than halfway into the on duration 524, for example, the eNB 102 sends a data transmission scheduling assignment to the UE 126. The UE 126 is able to receive and decode the transmission regardless of whether the eNB 102 sent the transmission using the LTTI 508 or the sTTI 518.

In a further embodiment, the UE 126 only scans for sTTI 518 transmissions during an on duration 526, the second of the two on durations for the DRX cycle 522. This is because the on duration 526 results solely from an active on duration of the timeline 510. The DRX cycle 502 makes no contribution to the union during the off duration 506. Therefore, there is an expectation that the network will send only sTTI 518 transmissions, and no LTTI 508 transmissions, to the UE 126 during the on duration 526.

The DRX cycle 522 has off durations 525 and 527. Each of the two off durations 525, 527 represents when off duration 506 for the timeline 500 overlaps with the off durations of the timeline 510, when the UE 126 is neither expecting an LTTI 508 nor an sTTI 518 transmission from the network.

For another embodiment, determining a union of at least one of the DRX parameters of the first and second DRX configurations includes the UE 126 determining a union of a first inactive time for monitoring for the data transmission scheduling assignments and a second inactive time for monitoring for the data transmission scheduling assignments, wherein the first inactive time is provided by the first DRX configuration and the second inactive time is provided by the second DRX configuration. The timeline 530, which includes an on duration 534 and an off duration 536, illustrates one such embodiment. For the timeline 530, the UE 126 enforces both the off durations of the timeline 500 and the off durations of the timeline 510. The timeline 530 shows an off duration when either of the timelines 500 and 510 show an off duration, which includes when both of the timelines 500 and 510 show an off duration.

Figure 6:
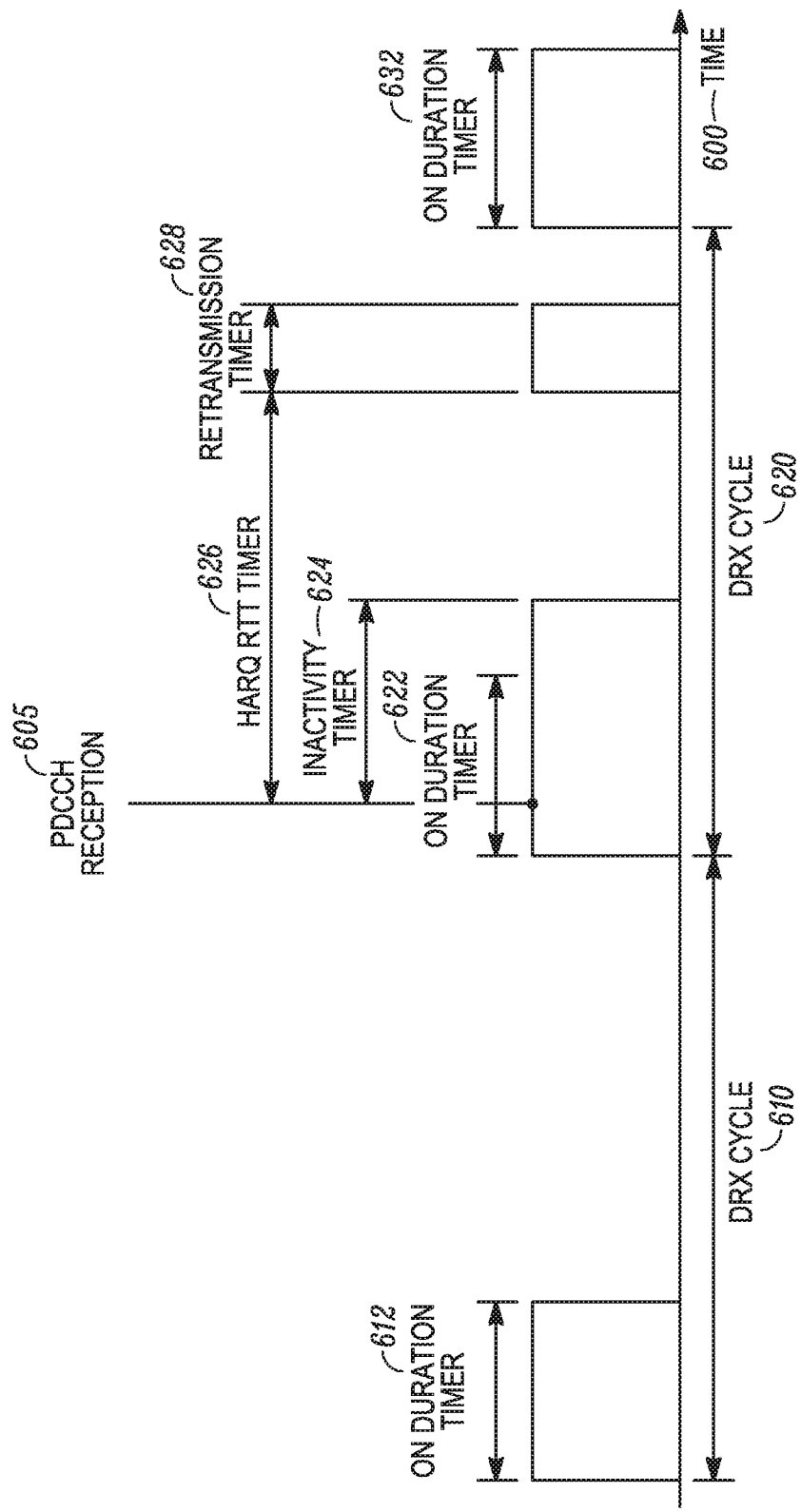
FIG. 6 shows a time sequence diagram illustrating various DRX parameters used to establish a DRX cycle in accordance with prior art.

FIG. 6 shows a time sequence diagram illustrating various DRX parameters used to establish a DRX cycle in accordance with prior art. In addition to the parameters associated with the timeline 300 of FIG. 3, a timeline 600 of FIG. 6 also illustrates parameters connected to an inactivity timer interval 624, a hybrid automatic repeat request round trip (HARQ RTT) timer interval 626, and a retransmission timer interval

628. The established DRX cycle presented in FIG. 6 is associated with a TTI one subframe in length corresponding to a 1 ms duration.

A set of DRX configuration parameters controls the expiration of the various timers illustrated in FIG. 6. The passage of time over which the timers run is measured by a clock internal to the UE 126. In some instances, the clock of the UE 126 is synched, up to a constant shift or timing advance, with a clock of the network when the UE 126 receives timekeeping signals from the network.

For a time interval 612, an on-duration timer for DRX cycle 610 starts and runs until its expiration. During this time, the UE 126 actively monitors for data transmission scheduling assignments. For the remainder of the DRX cycle 610, the UE 126 sleeps and does not actively scan for data transmission scheduling assignments. This provides power savings at the expense of latency.

As the on-duration timer again runs over a time interval 622 at the beginning of DRX cycle 620, the UE 126 receives a data transmission scheduling assignment from the eNB 102 at time 605. Reception of the data transmission scheduling assignment initializes the inactivity timer which runs over the time interval 624. The UE 126 continues to scan for data transmission scheduling assignments beyond the expiration of the on-duration timer corresponding to the time interval 622 until the inactivity timer corresponding to the time interval 624 expires. Reception of the data transmission scheduling assignment at time 605 causes the UE 126 to actively scan during the DRX cycle 620 longer than it otherwise would have. The philosophy is that if the network is actively communicating with the UE 126, then the network is more likely to send another communication in the near future than if the data transmission scheduling assignment at time 605 had not been received. If another data transmission scheduling assignment is received before the inactivity timer corresponding to the time interval 624 expires, then the inactivity timer corresponding to the time interval 624 is reinitialized, again extending the period of active scanning by the UE 126.

Reception at 605 of the data transmission scheduling assignment for scheduling a data transmission corresponding to a HARQ process also starts the HARQ RTT timer for that HARQ process, which runs over the time interval 626. The parameter controlling the duration 626 of the HARQ RTT timer specifies the minimum number of subframes, or 1 ms TTIs, before a downlink retransmission of the data transmission scheduled by the scheduling assignment transmitted at time 605 is expected from the network. After the network sends the data transmission scheduling assignment the UE 126 is shown to receive at time 605, the network waits to receive an acknowledgement (ACK) that the UE 126 received and successfully decoded the corresponding data transmission.

Sometimes, the UE 126 does not receive a transmission, or if it does receive the transmission, it fails to decode it. For a data transmission that was not successfully decoded, the network does not get an ACK back from the UE 126. This triggers the network to send another data transmission scheduling assignment after the HARQ RTT timer corresponding to the time interval 626 expires and during the time interval 628 when the retransmission timer is running and the UE 126 is actively scanning for the transmission. After the retransmission timer expires, the UE 126 sleeps until the next DRX cycle when the on-duration timer again runs over the time duration 632.

The parameter that controls the time duration 626 the HARQ RTT timer runs is chosen to account for a "round-trip" transmission time and processing time for the UE 126 to decode a data transmission. Only when the network fails to receive an ACK, or it receives a negative acknowledgement (NACK), does the network resend the data. Therefore, the HARQ RTT parameter takes into account the travel time of the data transmission to the UE 126, the processing time for the UE 126 to decode the transmission, and the time for the UE's ACK to reach and be processed by the network.

Figure 7:
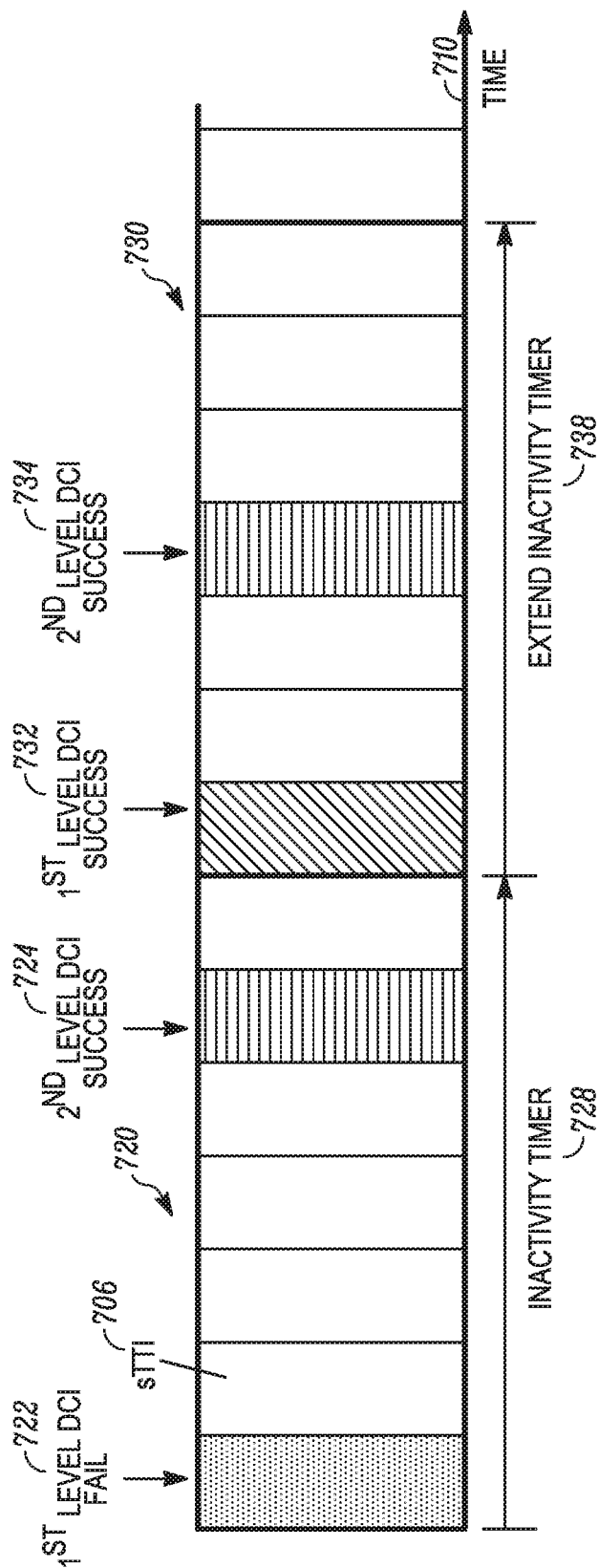
FIG. 7 shows a time sequence diagram illustrating DRX functionality for a shortened TTI length and/or shortened processing time in accordance with an embodiment.

FIG. 7 shows a time sequence diagram illustrating DRX functionality for a shortened TTI length with the UE 126 receiving control information from the network in two parts, also referred to herein as "levels," at two discrete times. In particular, FIG. 7 shows a timeline 710 for which the UE 126 actively scans for two-level data transmission scheduling assignments using sTTI 706. Two contiguous 1 ms subframes 720, 730 are shown, each framed by a bold border and each having a span of seven contiguous 143 µs sTTIs 706. Under ideal conditions, the UE 126 receives a first-level DCI at 722 during the first sTTI of the subframe 720. The first-level DCI includes information the UE 126 uses to decode a second-level DCI received at 724, during the sixth sTTI of the subframe 720. Under less than ideal conditions, the UE 126 fails to receive or fails to decode the first-level DCI at 722. The UE 126 discontinues scanning because it does not have the information from the first-level DCI to decode the second part of the scheduling assignment.

For an embodiment in accordance with the present teachings, the UE 126 monitoring for data transmission scheduling assignments based on the sTTI 706 includes the UE 126 monitoring for the data transmission scheduling assignments under the control of a DRX configuration associated with the sTTI 706 and specified by a set of DRX parameters. The UE 126 is configured for an active time for performing the monitoring and an inactive time for disabling the monitoring, wherein the active and inactive times are based on a first parameter of the set of DRX parameters. When the UE 126 detects only one part of a two-part scheduling assignment while monitoring during the active time, it extends the active time by an additional time period to continue performing the monitoring, wherein the additional time period is based on a second parameter of the set of DRX parameters.

As shown, for example, the UE 126 fails to receive the first-level DCI at 722 while an inactivity timer is running over a time period 728. The UE 126 does, however, receive the second part of the scheduling assignment at 724 but is unable to decode it for lack of having received the first part. Had the UE 126 received and decoded the two-part scheduling assignment in its entirety, it would have extended the inactivity timer by an additional time period 738. For the illustrated embodiment, reception of the second-level DCI at 724 alone serves as an indication to the UE 126 that the network is attempting to schedule it. As a consequence, the UE 126 extends the inactivity timer and continues to actively scan for the network's next scheduling transmissions, for example, to receive a first- and second-level DCI at 732 and 734, respectively. For the embodiment shown, the inactivity timer is extended by an additional time period of one subframe in length. In other embodiments, the additional time period by which the inactivity timer is extended can amount to any number of subframes or individual sTTIs.

Figure 8:
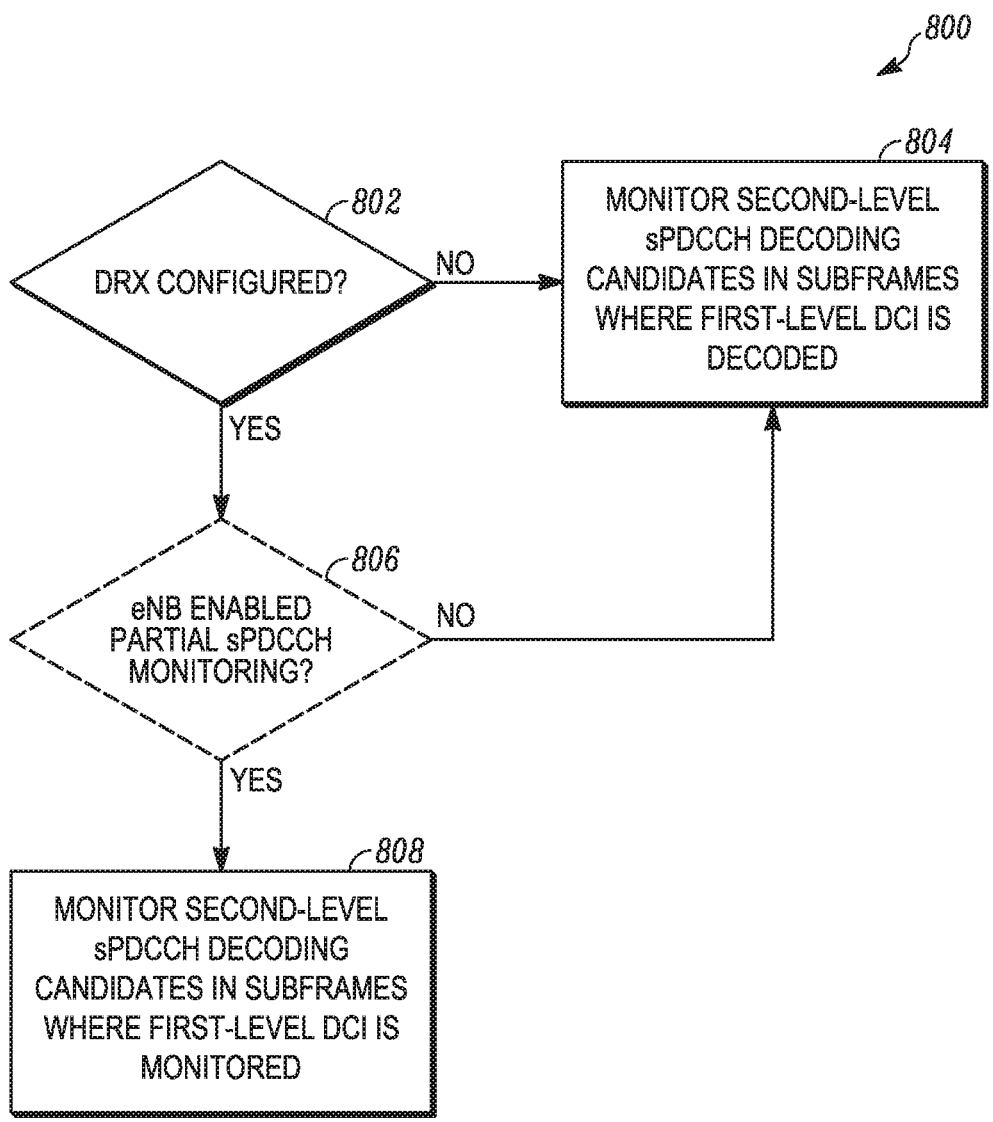
FIG. 8 shows a logical flow diagram illustrating DRX functionality for a shortened TTI length and/or shortened processing time in accordance with some embodiments.

FIG. 8 shows a flow diagram illustrating a method 800 involving DRX functionality for receiving control information in two parts while using a shortened TTI length. The method 800 begins with the UE 126 determining 802 if its DRX mode is configured and enabled. If the DRX mode is not enabled on the UE 126, then the UE 126 monitors 804 an sPDCCH (a PDCCH using sTTI) for second-level DCI decoding candidates in subframes where a first level DCI is decoded. If the first-level DCI is decoded, then the second-level DCI is a candidate for decoding. If the first-level DCI is not successfully decoded, then the second-level DCI is not a candidate for decoding because the UE 126 cannot decode the second-level DCI without having decoded the first level DCI. With DRX disabled, the UE 126 scans continuously and receives the next two-level DCI transmission from the network in a following subframe.

If the UE 126 determines 802 its DRX mode is configured and enabled, then the UE 126 monitors 808 the sPDCCH for second-level decoding candidates in subframes for which a first-level DCI is monitored, whether the detected first-level DCI is successfully decoded or not. If the first-level DCI is decoded, then the UE 126 monitors for and decodes the second-level DCI. If the first-level DCI is not decoded, the UE 126 still monitors for the second-level DCI as a decoding candidate even though the second-level DCI cannot be decoded. In this case, receiving the second-level DCI triggers an extension of the inactivity timer by an additional time period when the DRX mode is enabled on the UE 126.

In another embodiment, as indicated by broken lines, the UE 126 determines 806 if the eNB 102 has enabled a partial sPDCCH monitoring feature while the DRX mode is enabled on the UE 126. If the partial sPDCCH monitoring feature is enabled on the UE 126 by the eNB 102, then the UE 126 monitors 808 the sPDCCH for second-level decoding candidates in subframes for which a first-level DCI is decoded or only monitored and not necessarily decoded as previously described for box 808. If, however, the UE 126 determines 806 partial sPDCCH monitoring is not enabled, then the UE 126 monitors 804 the sPDCCH for second-level DCI decoding candidates in subframes where a first level DCI is decoded as previously described for box 804.

Partial sPDCCH monitoring allows for selective monitoring of second-level DCI decoding candidates when a DRX mode is enabled on the UE 126. In particular, it allows the network to control when to monitor for second-level DCI decoding candidates given that a first-level DCI is monitored but not decoded. For some embodiments, the network activates or deactivates selective monitoring depending upon values for DRX configuration parameters. In other embodiments, the network activates or deactivates selective monitoring on the UE 126 depending upon traffic type as determined by an identifiable category of communication occurring between the network and the UE 126. The network, for example, communicates a selective monitoring setting to the UE 126 using physical-layer or higher-layer signaling.

Figure 9:
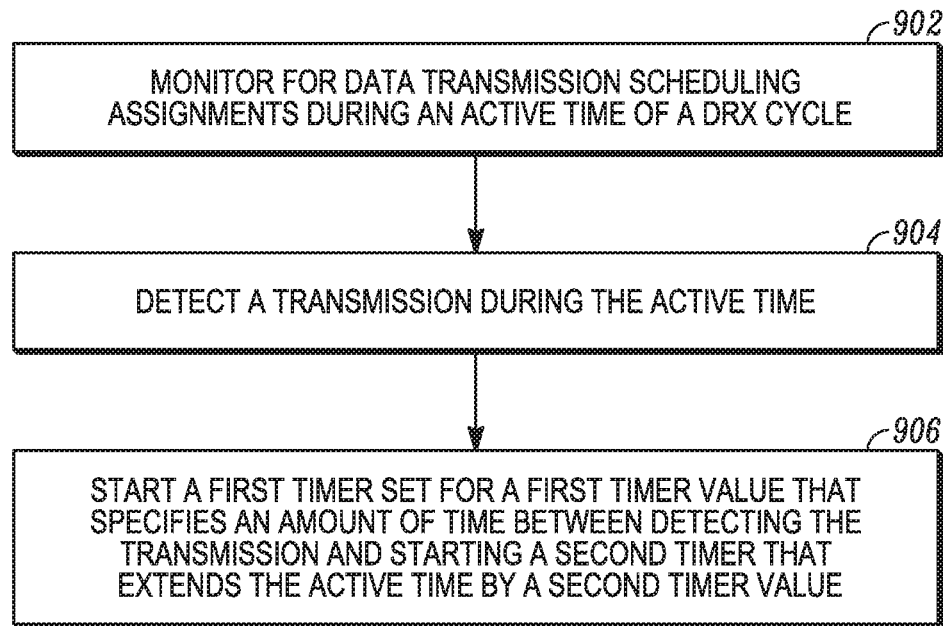
FIG. 9 shows a logical flow diagram illustrating a method for determining a timer value based on DRX operation using a shortened TTI in accordance with some embodiments.

FIG. 9 shows a logical flow diagram illustrating a method 900 for determining a timer value based on DRX operation using a shortened TTI in accordance with some embodiments. The UE 126, for example, monitors 902 for data transmission scheduling assignments during an active time of a DRX cycle. During the active time, the UE 126 detects 904 a transmission. The UE 126 then starts 906 a first timer set for a first timer value that specifies an amount of time between detecting the transmission and starting a second timer that extends the active time by a second timer value. For some embodiments, the first timer is a HARQ RTT timer and the second timer is a retransmission timer. The method 900 is described in greater detail with reference to FIGS. 10 through 12.

Figure 10:
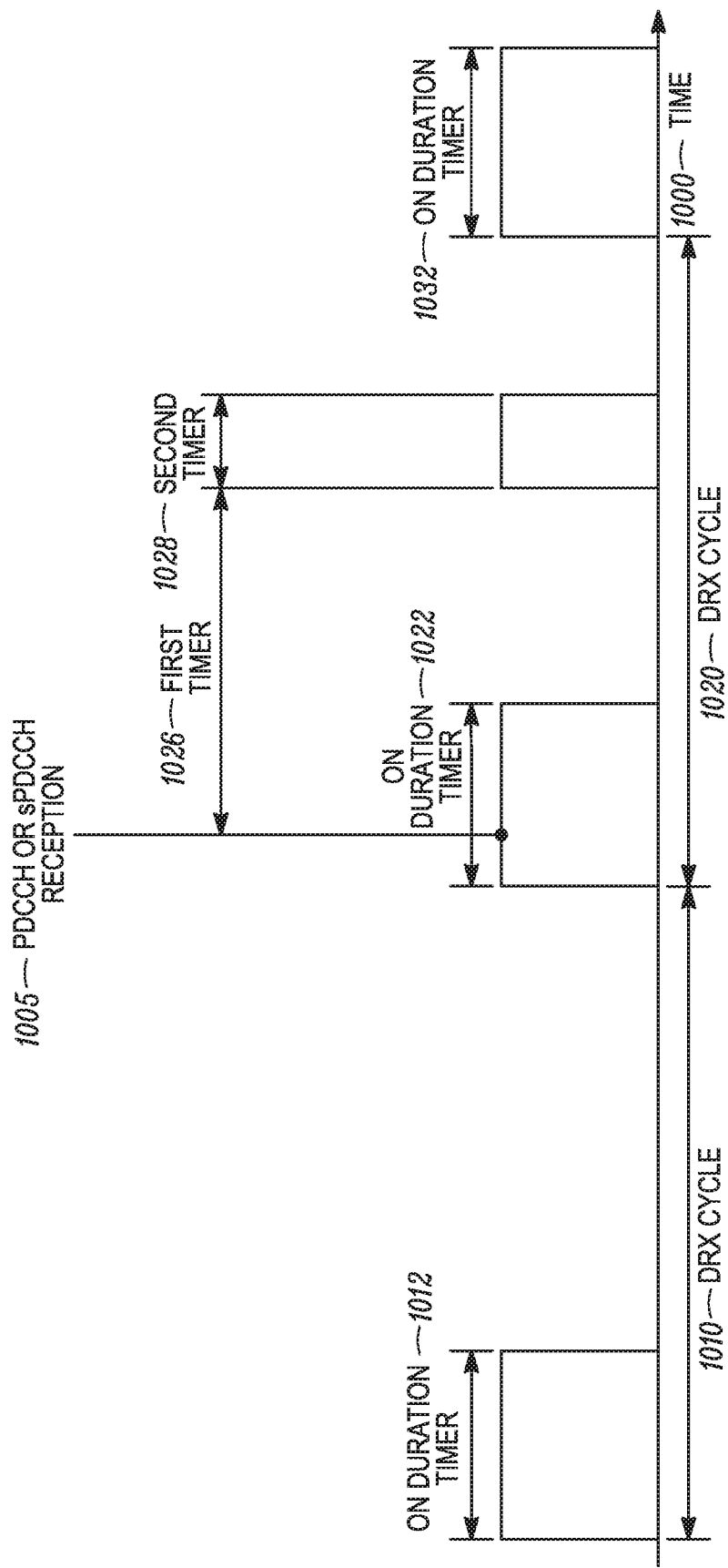
FIG. 10 shows a time sequence diagram illustrating various DRX parameters used to establish a DRX cycle in accordance with an embodiment.

FIG. 10 shows a time sequence diagram illustrating various DRX parameters used to establish a DRX cycle in accordance with the present teachings. The sequence diagram includes a timeline 1000 showing a DRX cycle 1010 having an on-duration time interval 1012, a DRX cycle 1020 having an on-duration time interval 1022, and another on-duration time interval 1032 beginning a next DRX cycle. For some embodiments, the DRX cycles 1010 and 1020 have the same DRX configuration parameters.

In one embodiment, the UE 126 monitors for data transmission scheduling assignments during an active time of the DRX cycle 1020 and detects a data transmission scheduling assignment during the active time at time 1005. The UE 126 starts a first timer, in response to the detecting, wherein the first timer is set for a first timer value that specifies an amount of time 1026 between detecting the transmission and starting a second timer that extends the active time by a second timer value specifying an amount of time 1028. The first timer value is determined based on one or both of a selected first TTI length from multiple TTI lengths for which the UE 126 can be enabled and/or a selected shorter first processing time over a second processing time associated with a TTI length used by the UE 126.

The UE 126, for example, receives a data transmission scheduling assignment at 1005 while using sTTI to monitor an sPDCCH over the time interval 1022. The UE 126 then starts the first timer, which is set for a first timer value of 4 ms. At a later time (not shown) the UE 126 receives another data transmission scheduling assignment while using LTTI to monitor a PDCCH. The UE 126 then starts the first timer, which is now set for a first timer value of 8 ms. In further embodiments, the second timer value also depends upon whether the UE 126 is scanning using sTTI or LTTI.

For some embodiments, the first timer value is a HARQ RTT timer value used by the UE 126, and the second timer value is a DRX retransmission timer value used by the UE 126. In additional embodiments, the HARQ RTT timer value used by the UE 126 is different from a HARQ RTT timer value used by a different UE, such as the UE 128. The RAN 110, for example, accommodates different UEs using different HARQ RTT timer values. In particular, the eNB 102 waits for varying amounts of time before sending data retransmissions to the UEs 126 and 128. In some embodiments, the varying amounts of time are due to the transmission to the UE 126 being a sTTI transmission and the transmission to the UE 128 being an LTTI transmission, wherein the sTTI time interval is shorter than the LTTI time interval.

In one embodiment, a first TTI length, associated with an sTTI, is used for sending the data transmission scheduling assignment that was detected during the active time interval 1022 at the time 1005. Based on this, the UE 126 uses a particular first timer value associated with the first TTI length. Later, the UE 126 receives another data transmission scheduling assignment using a second TTI length, associated with a LTTI. The UE 126 responsively uses another first timer value associated with the second TTI length. For an additional embodiment, the second timer value the UE 126 uses also depends upon whether a data transmission scheduling assignment, which could not be decoded, was received using the first or the second TTI length.

For some embodiments, the UE 126 determines the first timer value and then communicates the first timer value to the network, for example, via the eNB 102. In other embodiments, the network determines the first timer value for the UE 126, and the UE 126 receives the first timer value from the network. For a particular embodiment, the first timer value corresponds to a particular downlink HARQ process.

In one embodiment, the UE 126 extends the active time interval 1022 using an inactivity timer if the UE 126 receives either an LTTI or an sTTI grant. In a further embodiment, the value of the inactivity timer depends on whether the US 126 receives an LTTI or an sTTI grant.

Figure 11:
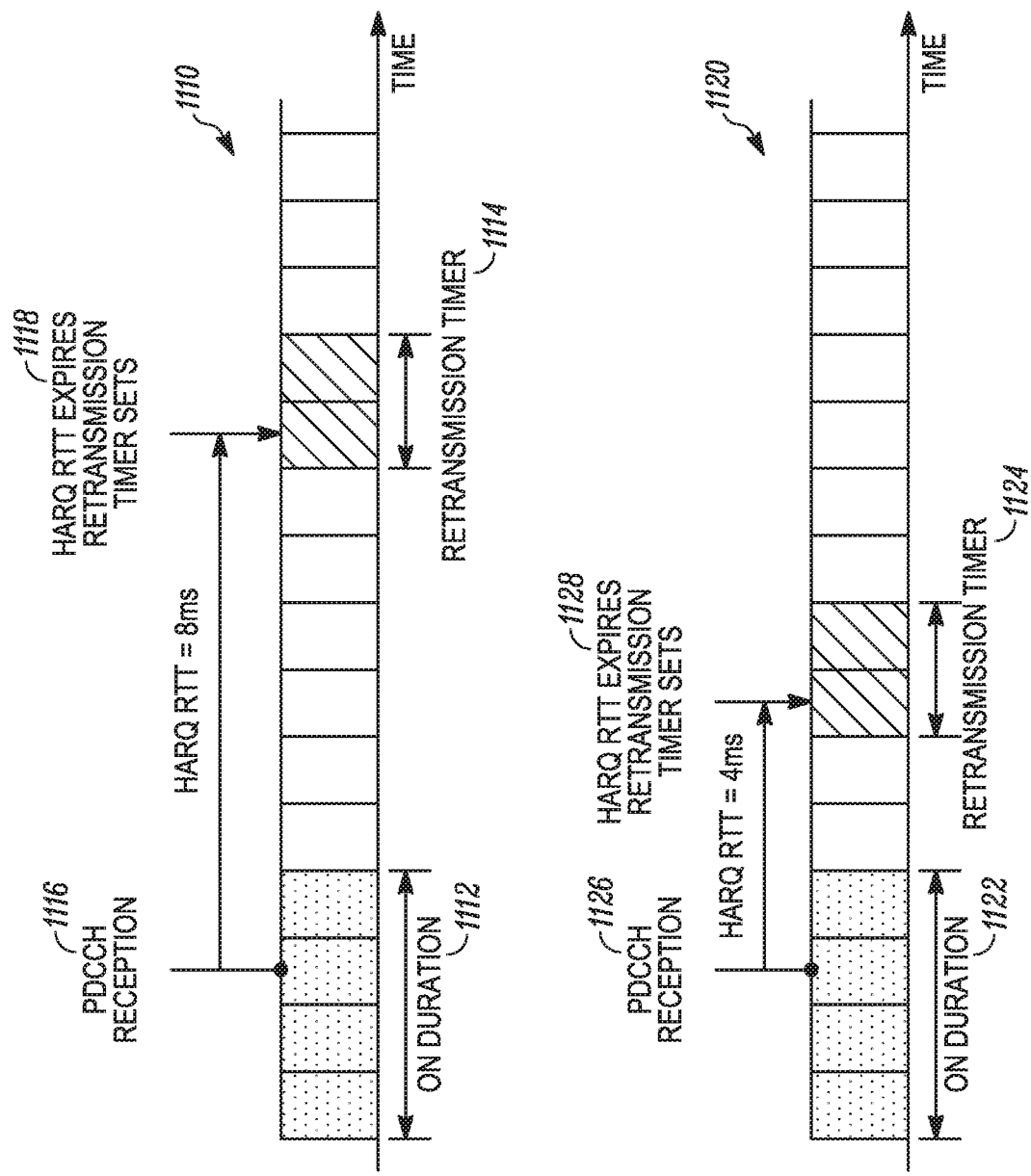
FIG. 11 shows time sequence diagrams illustrating DRX functionality for a shortened TTI length and/or shortened processing time in accordance with an embodiment.

FIG. 11 shows time sequence diagrams illustrating the first timer value being determined based on a processing time associated with a TTI length used by the UE 126. As shown, the first timer is a HARQ RTT timer and the second timer is a retransmission timer, consistent with the UE 126 operating within an LTE network for some embodiments. For both timelines 1110 and 1120, the UE 126 monitors a PDCCH for data transmission scheduling assignments using LTTI with an associated length of one subframe or 1 ms.

On the timeline 1110, the UE 126 receives a data transmission scheduling assignment at time 1116 occurring for the third LTTI of an on-duration time interval 1112. The UE 126 receives and processes the data transmission scheduled by the received data transmission scheduling assignment using LTTI but is unable to decode it. The HARQ RTT timer starts with the reception of the data transmission scheduling assignment at the time 1116 and runs for 8 ms, spanning eight subframes, before expiring at time 1118 when a retransmission timer sets. The retransmission timer runs for two subframes over a time interval 1114. During this time, the UE 126 actively monitors the PDCCH for another data transmission scheduling assignment corresponding to the retransmission of the data transmission. With the UE 126 using LTTI, the HARQ RTT timer value of eight subframes provides sufficient time for the UE 126 to decode received data transmissions and to send ACKs to the network, thereby canceling automatic retransmission of data that is successfully decoded by the UE 126.

Timeline 1120 is associated with a shorter HARQ RTT timer value due to shorter processing times where the UE 126 uses slot-length sTTI capability for processing received data transmission scheduling assignments and data transmissions as opposed to subframe-length LTTI-based processing. On the timeline 1120, the UE 126 receives a data transmission scheduling assignment at time 1126 occurring for the third LTTI of an on-duration time interval 1122. The UE 126 receives and processes the corresponding data transmission using sTTI capability but is unable to decode it.

The HARQ RTT timer starts with the reception of the data transmission scheduling assignment at the time 1126 and runs for only 4 ms, 4 ms less than for LTTI-based processing capability, before expiring at time 1128. The retransmission timer runs for two subframes over a time interval 1124 during which retransmission of the data transmission is expected. Using sTTI for processing, the HARQ RTT timer value of four subframes provides sufficient time for the UE 126 to decode received data transmissions and to send ACKs to the network, thereby canceling automatic retransmissions of data transmissions that are successfully decoded.

For several embodiments, the UE 126 is capable of using a shorter TTI than a standard 1 ms TTI but uses the standard 1 ms TTI with a shorter processing time. This is based on only part of the processing time being dependent on the TTI length. For an embodiment of PDSCH operation, the UE 126 performs the following tasks: decode the DL grant, channel estimation for PDSCH demodulation, PDSCH data turbo decoding, prepare the related Ack-Nack for transmission start the Ack-Nack transmission on PUCCH/PUSCH 3 TTIs (i.e. in N+4) after the end of the DL TTI carrying the PDSCH. In some instances, the above tasks are almost independent of the TTI length. Therefore, the total processing time of legacy 1 ms TTI can be reduced to 2 ms, as an example of the UE 126 having slot-level sTTI capability, assuming linear scaling of the processing time with supported shortened TTI length.

In some embodiments for which the first timer value is determined, at least in part, from a shorter first processing time selected over a longer second processing time associated with a TTI length used by the UE 126, the shorter first processing time is based on a minimum time duration between receiving an uplink grant during an active time of the UE 126 and a corresponding uplink transmission by the UE 126. For example, the UE 126 receives an UL grant from the eNB 102 on a control channel, such as a PDCCH, and references an associated time using a clock internal to the UE 126 or timing signals received from a network via the eNB 102. After processing the UL grant, the UE 126 makes an uplink transmission on a PUSCH and again references an associated time. The UE 126 takes a difference between the referenced times to get a time interval used in determining the first processing time.

In another embodiment, the network measures a time interval from when it sends the UL grant to the UE 126 to when it receives the UL transmission from the UE 126. The network determines the first timer value from the measured time interval and communicates the first timer value to the UE 126.

For other embodiments, the shorter first processing time is based on a minimum time duration between the UE 126 receiving downlink data and corresponding downlink HARQ feedback transmitted by the UE 126. For example, the UE 126 receives a DL transmission from the eNB 102 on a PDSCH and references an associated time using a clock internal to the UE 126 or timing signals received from a network via the eNB 102. After processing the DL transmission to decode its contents, the UE 126 transmits a corresponding ACK on a PUCCH or a PUSCH and again references an associated time. The UE 126 takes a difference between the referenced times to get a time interval used in determining the first processing time.

In another embodiment, the network measures a time interval from when it sends the DL transmission to the UE 126 to when it receives the ACK from the UE 126. The network determines the first timer value from the measured time interval and communicates the first timer value to the UE 126.

For a number of embodiments, the PUSCH transmission time is based on the first processing time. Therefore, the first timer value is determined based on the first processing time the UE 126 is capable of. For example, the HARQ RTT timer value is determined by the capability of the UE to support faster receptions and transmissions rather than by a measured time difference.

Figure 12:
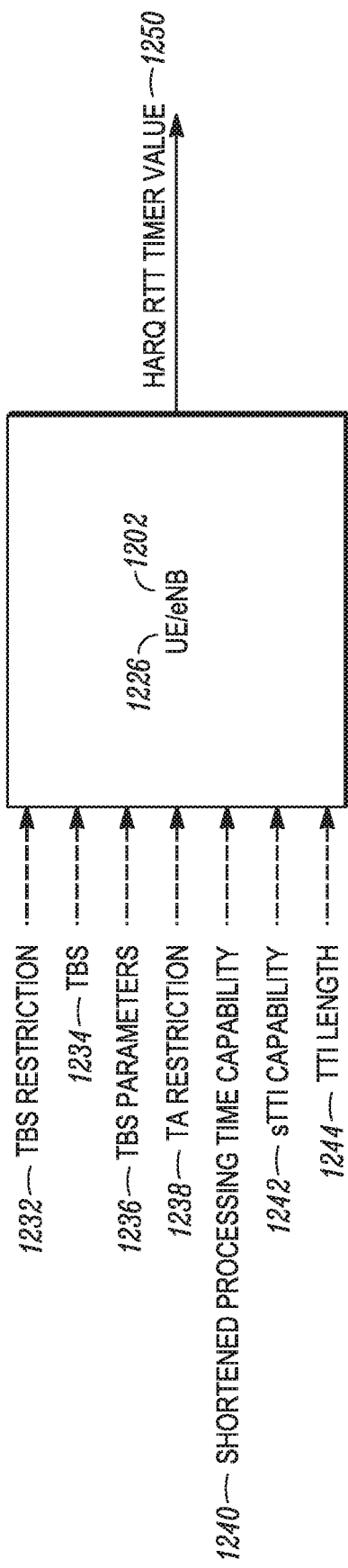
FIG. 12 shows a block diagram illustrating a method for determining a DRX parameter in accordance with some embodiments.

FIG. 12 shows a block diagram illustrating a method for determining a first timer value, for example, a HARQ RTT timer value, in accordance with some embodiments for which the first timer value is adjustable based on one or more adjustment factors. For instance, the UE 126 monitoring for data transmission scheduling assignments based on an sTTI includes the UE 126 monitoring for the data transmission scheduling assignments under the control of a DRX configuration associated with the sTTI. The DRX configuration is associated with a set of DRX parameters having a first timer value and a second timer value, wherein the first timer value specifies an amount of time between detecting a transmission, while performing the monitoring, and starting a timer for the second timer value, wherein the first timer value is adjustable based on one or more adjustment factors.

In particular, FIG. 12 shows either a UE 1226 or an eNB 1202, depending upon the embodiment, determining or adjusting a HARQ RTT timer value 1250 based on one or more adjustment factors from a set of adjustment factors. The set of adjustment factors shown includes a transport block size (TBS) restriction 1232, a TBS 1234, TBS parameters 1236, a timing advance (TA) restriction 1238, shortened processing time capability 1240, sTTI capability 1242, and a TTI length 1244. For an embodiment, the UE 1226 receives, from a network, at least one timer value adjustment factor, which the UE 1226 uses in determining the first timer value. Also, the UE 1226 may be configured via higher layers to operate in a low-latency transmission mode using 1 ms TTI.

The time it takes the UE 1226 to process a received DL transmission can depend upon the UE 1226 having sTTI capability 1242, or with more specificity, upon which TTI length 1244 the UE 1226 is using in particular. The UE 1226 having a shortened processing time capability 1240, as described above with respect to FIG. 11, can also provide information on how quickly the UE 1226 can process received DL transmissions. By extension, because HARQ RTT timer values allow for signal processing, these timer value adjustment factors play a part in determining the best value for which to set a HARQ RTT timer.

Additional timer value adjustment factors include those related to TBS. A transport block is data given by an upper layer of a network to its physical layer for transmission. The TBS 1234 is the amount of data transmitted with each TTI. In some instances, there is a TBS restriction 1232 in which the actual data payload for a TTI is less than a full amount of data the TTI can carry. The data payload of a TTI might be restricted, for example, if sTTI signal processing is being used to decode LTTI transmissions. In some instances the UE 1226 or the eNB 1202 uses TBS parameters 1236 in addition to or in place of the TBS 1234 in determining the HARQ RTT timer value 1250. TBS parameters 1236 can include data used in calculating a TBS 1234, such as a number of physical resource blocks and/or a modulation and coding scheme. In some instances, the TBS parameters 1236 are used to determine the TBS restriction 1232.

The TA is a negative time offset the UE 1226 applies to a UL transmission the UE 1226 sends to the eNB 1202 after receiving a DL transmission from the eNB 1202. UEs apply TAs to synchronize DL and UL subframes at the eNB 1202. The TA takes into account the travel time of a transmission between the UE 1226 and the eNB 1202, which is directly proportional to the distance between the UE 1226 and the eNB 1202. The eNB 1202, for example, makes synchronized transmissions to a group of UEs. Each UE receives its transmission at a different time because each UE has a different distance from the eNB 1202. Each UE then advances its responsive UL transmission to the eNB 1202 by a TA of twice a distance-dependent propagation time for that UE. In so doing, the responsive UL transmissions from the group of UEs are synchronized in their arrival at the eNB 1202.

TAs can affect processing time for received DL transmission because some of the time otherwise available for processing might be needed in applying the TA. Generally, due to a larger TA, a UE which is further away from an eNB has less time to process a DL transmission than a UE which is closer to the eNB and receives the transmission earlier. In different embodiments, different eNBs impose different TA restrictions 1238. TAs, for example, can be restricted to be less than a maximum value and/or be limited to a finite number of discrete values.

For some embodiments, at least one received timer value adjustment factor includes one or more of: a set of TBS parameters 1236; a TBS 1234; a TBS restriction 1232; or a TA restriction 1238. In one embodiment, the UE 1226 receives the set of TBS parameters from the network and determines the TBS 1234 based on the TBS parameters 1236. Based on the TBS 1234, the UE 1226 determines the TBS restriction 1238 used in determining the first timer value. For another embodiment, the UE 1226 receives the TBS 1234 from the network and determines, based on the TBS 1234, the TBS restriction 1232 used in determining the first timer value.

For a particular embodiment, multiple TBS restriction values are stored on the UE 1226, for example, in its memory. Based on a TBS 1234 or a set of TBS parameters 1236 the UE 1226 receives from the eNB 1202, the UE 1226 selects a TBS restriction 1232 from the multiple stored values. In one instance, the UE 1226 uses a look-up table to select the TBS restriction 1232 from the multiple stored TBS restriction values.

The UE 1226 can also receive a control signal from the network. Based on the received control signal, the UE 1226 selects a first transmission time interval from which the UE 1226 determines the first timer value. For example, the control signal can be a radio resource control (RRC) signal, MAC-CE signal, or a sPDCCH/PDCCH signal indicating the TTI length.

Setting a proper value for a HARQ RTT timer can reduce scheduling delay due to DRX operation and/or conserve energy. Further, there could be multiple HARQ processes with each HARQ process having a different HARQ RTT timer value. For one embodiment involving downlink spatial multiplexing, if a transport block (TB) is received while a HARQ RTT timer is running and if the previous transmission of the same TB was received at least N subframes before the current subframe (where N corresponds to the HARQ RTT Timer), then the MAC entity processes the TB and restarts the HARQ RTT timer.

In another embodiment, the UE 1226 determines a minimum timing based on a scheduled TBS and TBS restriction. Based on the scheduled TB size (maximum TB size in case of more than single scheduled TB), the minimum timing can be n+2 or n+3, for example, for a DL grant sent on subframe "n." The minimum timing for UL grant to UL data and for DL data to DL HARQ for 1 ms TTI with shortened processing can be adjusted based on the scheduled TB size and TBS restrictions. If the UE 1226 is scheduled with a TBS larger than that of its corresponding TBS restriction(s) while operating in reduced-processing mode, the UE 1226 discards the grant.

For one embodiment, a maximum TA restriction changes for the UE 1226 as the UE 1226 moves from a first cell with a first maximum TA restriction to a second cell with a second maximum TA restriction. The different maximum TA restrictions affect the processing time capability of the UE 1226. The UE 1226 determines a new processing time capability and adjusts its HARQ RTT timer value 1250.

For several embodiments, different HARQ processes may have different HARQ RTT timer values. For example, different HARQ processes could have different TTI lengths and/or TBS restrictions. The eNB 1202 can send the HARQ RTT timer value for the UE 1226 (or a group of UEs) via a PDCCH in a common search space. The eNB 1202 can send the HARQ RTT timer value for the UE 1226 via dedicated higher layer signaling such as MAC-CE or RRC.

Figure 13:
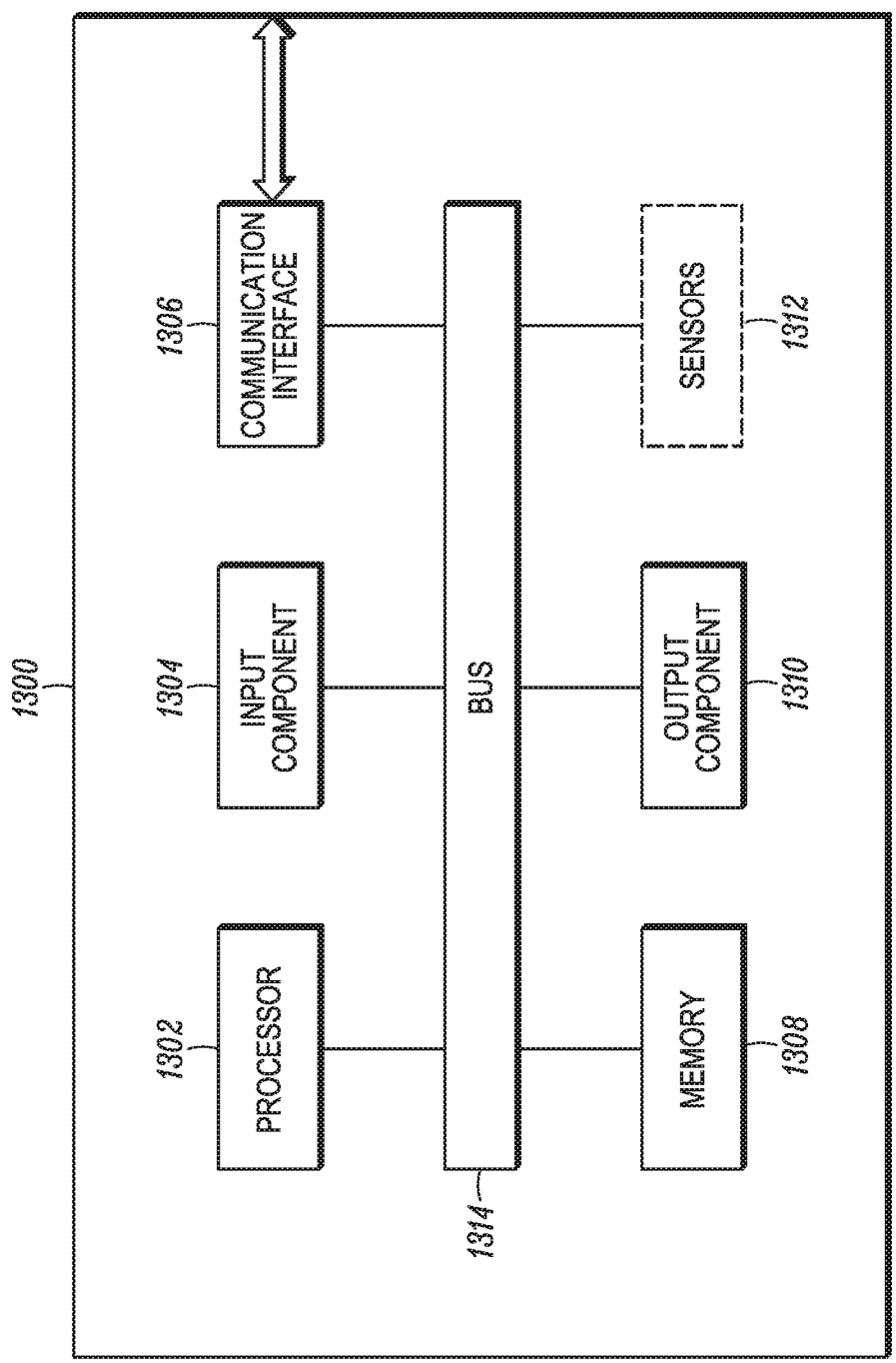
FIG. 13 shows a block diagram illustrating internal hardware components of a UE configurable in accordance with some embodiments.

FIG. 13 shows a block diagram of a UE 1300, which for particular embodiments represents the UE 126 or the UE 1226. In other embodiments, the UE 1300 represents a smartwatch, a phablet, a tablet, a personal media player, a personal or enterprise digital assistant, a laptop, a personal computer, or any other electronic device that operates in accordance with the teachings herein. Included in the block diagram are a processor 1302, one or more input components 1304, one or more communication interfaces 1306, memory 1308, one or more output components 1310, and sensors 1312, which are all operatively interconnected by a bus 1314. A limited number of components 1302, 1304, 1306, 1308, 1310, 1312, 1314 are shown in the UE 1300 for ease of illustration. Other embodiments may include a lesser or greater number of components in a UE. Moreover, other components needed for a commercial embodiment of a UE that incorporates the components shown are omitted from FIG. 13 for clarity with respect to the embodiments described.

In general, the processor 1302 is configured with functionality in accordance with embodiments of the present disclosure as described herein with respect to the previous figures. "Configured," "adapted," "operative," or "capable," as used herein, means that indicated components are implemented using one or more hardware elements, such as one or more operatively coupled processing cores, memory elements, and interfaces, which may or may not be programmed with software and/or firmware, as the means for the indicated components to implement their desired functionality. Such functionality is supported by the other hardware shown in FIG. 13, including the device components 1304, 1306, 1308, 1310, and 1312, which are all operatively interconnected with the processor 1302 by the bus 1314.

The processor 1302, for instance, includes arithmetic logic and control circuitry necessary to perform the digital processing, in whole or in part, for the UE 1300 to utilize a shortened TTI length and/or a shortened processing time associated with a longer TTI length in accordance with described embodiments. For one embodiment, the processor 1302 represents a primary microprocessor, also referred to as a central processing unit (CPU), of the UE 1300. For example, the processor 1302 can represent an application processor of a smartphone. In another embodiment, the processor 1302 is an ancillary processor, separate from the CPU, wherein the ancillary processor is dedicated to providing the processing capability, in whole or in part, needed for the components of the UE 1300 to perform at least some of their intended functionality. For one embodiment, the ancillary processor is a graphical processing unit (GPU) for a touchscreen or another graphical output component.

The memory 1308 provides storage of electronic data used by the processor 1302 in performing its functionality. For example, the processor 1302 can use the memory 1308 to load programs and/or store files associated with the UE 1300 utilizing a shortened TTI length and/or a shortened processing time associated with a longer TTI length. In one embodiment, the memory 1308 represents random access memory (RAM). In other embodiments, the memory 1308 represents volatile or non-volatile memory. For a particular embodiment, a portion of the memory 1308 is removable. For example, the processor 1302 can use RAM to cache data while it uses a micro secure digital (microSD) card to store files associated with looking up TBS restrictions.

The input component 1304 and the output component 1310 represent user-interface components of the UE 1300 configured to allow a person to use, program, or otherwise interact with the UE 1300. Different UEs for different embodiments include different combinations of input 1304 and output 1310 components. A touchscreen, for example, functions both as an output component 1310 and an input component 1304 for some embodiments by allowing a user to use an application that is optimized by the use of sTTI and/or shorter processing times. Peripheral devices for other embodiments, such as keyboards, mice, and touchpads, represent input components 1304 that enable a user to configure applications that benefit from the use of sTTI and/or shorter processing times. A speaker is an output component 1310 that for some embodiments allows the UE 1300 to acoustically prompt a user for input. Particular embodiments include an acoustic transducer, such as a microphone, as an input component 1304 that converts received acoustic signals into electronic signals, which can be processed for voice recognition. In a further embodiment, the UE 1300 includes one or more imaging devices as input components 1304, such as cameras.

One or more communication interfaces 1306 allow for communication between the UE 1300 and a RAN of a wireless communication system, such as the communication system shown for the environment 100. The one or more communication interfaces 1306 also allow the UE 1300 to communicate with other electronic devices, such as web servers or file-storage devices, configured to support the UE 1300 in performing its described functionality. From these other devices, for example, the EU 1300 can download and/or update software programs which configure the UE 1300 for using sTTI and/or a shortened processing time for received data transmission scheduling assignments.

For one embodiment, the communication interfaces 1306 include a cellular transceiver to enable the UE 1300 to communicate with other devices using one or more cellular networks. Cellular networks can use any wireless technology that, for example, enables broadband and Internet Protocol (IP) communications including, but not limited to, $3^{rd}$ Generation (3G) wireless technologies such as CDMA2000 and Universal Mobile Telecommunications System (UMTS) networks or $4^{th}$ Generation (4G) wireless networks such as LTE and WiMAX.

In another embodiment, the communication interfaces 1306 include a wireless local area network (WLAN) transceiver that allows the UE 1300 to access the Internet using standards such as Wi-Fi. The WLAN transceiver allows the UE 1300 to send and receive radio signals to and from similarly equipped electronic devices using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

The sensors 1312 included in some embodiments, as indicated by broken lines, allow the UE 1300 to detect events or environmental changes beyond direct user-initiated input received through the input component 1304. Sensors 1312 can include, but are not limited to, accelerometers, gyrometers, contact sensors, and thermal sensors. The gyrometer, for example, detects an angular velocity or a rate of rotation for the UE 1300 about one or more axes. Contact sensors detect a user's grip on the UE 1300. A single-axis or a multiple-axis accelerometer measures acceleration for the UE 1300 in one or more directions, and thermal sensors detect a position of a user with respect to the UE 1300. For one embodiment, the combination of sensors 1312 provide data to the UE 1300 which allows the UE 1300 to make a determination that a user is gaming on the UE 1300. If the gaming is such that it would benefit from low-latency communication with a wireless network, a remote peer-to-peer game, for example, the UE 1300 initiates sTTI and/or shorter processing times in accordance with embodiments described herein.

A power supply included in the UE 1300 (not pictured) represents a power source that supplies electric power to the device components 1302, 1304, 1306, 1308, 1310, 1312, 1314, as needed, during the course of their normal operation. The power is supplied to meet the individual voltage and load requirements of the UE 1300 components 1302, 1304, 1306, 1308, 1310, 1312, 1314 that draw electric current. For some embodiments, the power supply is a wired power supply that provides direct current from alternating current using a full- or half-wave rectifier. For other embodiments, the power supply is a battery that powers up and runs the UE 1300. For a particular embodiment, the battery is a rechargeable power source. A rechargeable power source for a UE is configured to be temporarily connected to another power source external to the electronic device to restore a charge of the rechargeable power source when it is depleted or less than fully charged. In another embodiment, the battery is simply replaced when it no longer holds sufficient charge.

Figure 14:
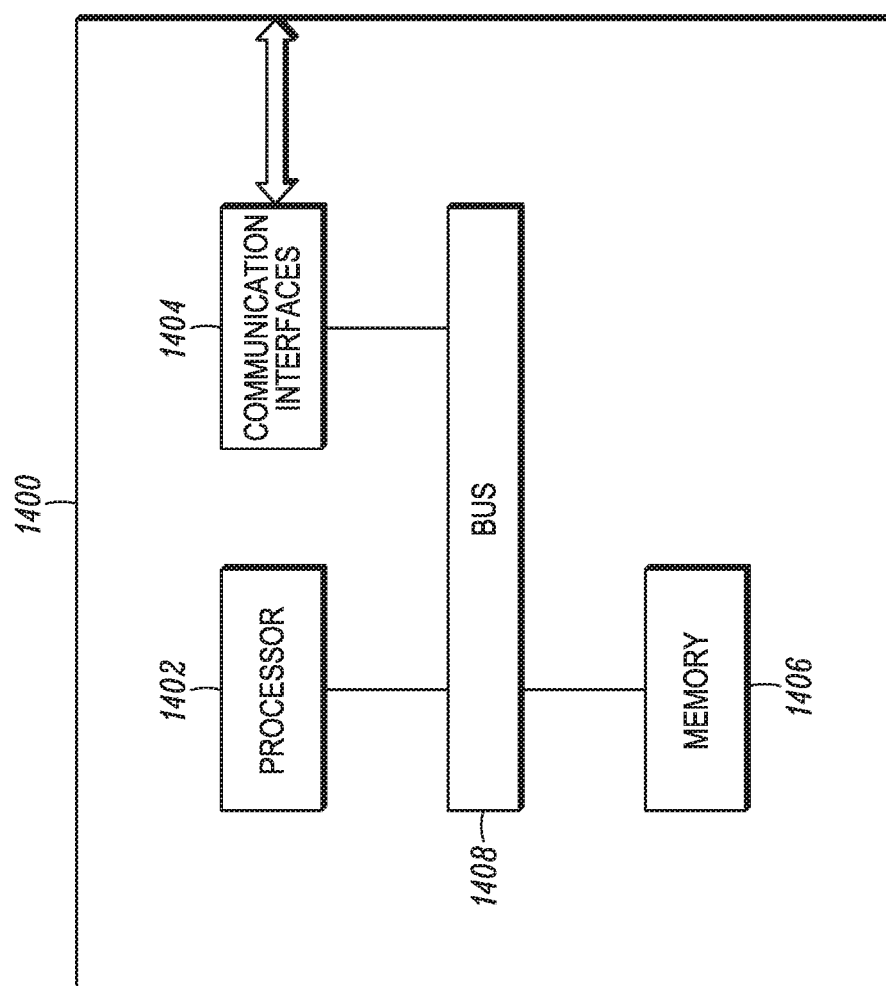
FIG. 14 shows a block diagram illustrating internal hardware components of an eNB configurable in accordance with some embodiments.

FIG. 14 shows a block diagram of an eNB 1400, which for particular embodiments represents the eNB 102 or the eNB 1202. Included in the block diagram are a processor 1402, one or more communication interfaces 1404, and memory 1406, which are all operatively interconnected by a bus 1408. A limited number of components 1402, 1404, 1406, 1408 are shown in the eNB 1400 for ease of illustration, and other embodiments may include a lesser or greater number of components in an eNB.

The processor 1402, for instance, includes arithmetic logic and control circuitry necessary to perform the digital processing, in whole or in part, for the eNB 1400 to support UEs operating with a shortened TTI length and/or a shortened processing time in accordance with described embodiments. For some embodiments, the processor 1402 represents multiple microprocessors which can operate in parallel to perform a common task or operate independently to perform separate tasks. In other instances, the processor 1402 has multiple processing cores. For one embodiment, the processor 1402 provides for encryption, decryption, and authentication, including support for Kasumi and/or SNOW3G ciphers, for example; ingress and egress packet parsing and management; packet ordering; TCP segmentation offload, and hardware time stamping. In another embodiment, the processor 1402 provides the processing capability, in whole or in part, needed for the communication interfaces 1404 of the eNB 1400 to perform at least some of their intended functionality.

The communication interfaces 1404 allow for communications, using various protocols, between the eNB 1400 and UEs and also between the eNB 1400 and entities within a wireless communication network of which the eNB 1400 is a part. The communication interfaces 1404 support, for example, in an embodiment consistent with LTE, a Uu interface between the eNB 102 and the UE 1300; a S1-MME IP interface between the eNB 102 and the MME 112; an X2 interface between the eNB 102 and eNBs 104, 106, and 108; and an S1-U user plane interface between the eNB 102 and the SGW 114.

The memory 1406 provides storage of electronic data used by the processor 1402 in performing its functionality. For example, the processor 1402 can use the memory 1406 to load programs, store files, and/or cache data associated with the eNB 1400 providing support for UEs to operate with a shortened TTI length and/or a shortened processing time in accordance with described embodiments. In one embodiment, the memory 1406 represents RAM. In other embodiments, the memory 1406 represents volatile or non-volatile memory. For a particular embodiment, a portion of the memory 1406 is removable, replaceable, and/or scalable.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may include one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a device, the method comprising:
    monitoring for data transmission scheduling assignments during an active time of a discontinuous reception cycle, and detecting a transmission corresponding to a first downlink HARQ process during the active time; and
    determining whether to start a timer, wherein in response to determining to start the timer, the timer is set for a timer value that extends the active time by a configured amount of time since the detecting;
    wherein the detected transmission is a first physical downlink control channel (PDCCH) containing a first downlink control information (DCI);
    wherein decoding the first DCI is dependent on a second DCI, wherein the second DCI is contained in a second PDCCH; and wherein the second PDCCH occurs before the first PDCCH; and
    wherein the device, in response to detecting only the first PDCCH among the first PDCCH and the second PDCCH, determines to start the timer based on a configuration parameter.

2. The method of claim 1, further comprising:
    receiving an indication from a network; the indication enabling a first data processing timeline; and
    changing a value of the timer of the discontinuous reception cycle based on the first data processing timeline.

3. The method of claim 2, wherein the timer of the discontinuous reception cycle is a drx-ShortCycleTimer, and wherein
    the drx-ShortCycleTimer specifies a duration that a short DRX cycle is repeated in a time domain before transitioning to a long DRX cycle, conditioned on no transmissions being received when the drx-ShortCycleTimer is running, and the long DRX cycle comprises at least one short DRX cycle.

4. The method of claim 1, wherein the timer value is a discontinuous reception inactivity timer value used by the device.

5. The method of claim 1, further comprising starting a HARQ round trip time timer used by the device, in response to the detecting, wherein the HARQ round trip timer is set for a HARQ round trip time timer value that specifies an amount of time between detecting the transmission and starting a discontinuous reception retransmission timer used by the device that extends the active time by a discontinuous reception retransmission timer value; and
    wherein the discontinuous reception retransmission timer value is determined based on a first transmission time interval length from multiple transmission time interval lengths for which the device can be enabled, where the first transmission time interval length is associated with the detected transmission.

6. The method of claim 5, wherein the first transmission time interval length is shorter than a second transmission time interval length of the multiple transmission time interval lengths.

7. The method of claim 6, further comprising switching from monitoring for data transmission scheduling assignments under the control of a discontinuous reception configuration associated with the second transmission time interval to monitoring for the data transmission scheduling assignments based on the first transmission time interval.

8. The method of claim 6, wherein the first transmission time interval length comprises a first set of OFDM symbols, and the second transmission time interval length comprises a second set of OFDM symbols.

9. The method of claim 5, wherein the first transmission time interval length is used for sending the transmission that was detected during the active time.

10. A device comprising:
    a communication interface and processor operatively coupled together to:
        monitor for data transmission scheduling assignments during an active time of a discontinuous reception cycle, and detecting a transmission corresponding to a first downlink HARQ process during the active time; and
        determine whether to start a timer, wherein in response to determining to start the timer, the timer is set for a timer value that extends the active time by a configured amount of time since the detecting;
    wherein the detected transmission is a first physical downlink control channel (PDCCH) containing a first downlink control information (DCI);
    wherein decoding the first DCI is dependent on a second DCI, wherein the second DCI is contained in a second PDCCH; and wherein the second PDCCH occurs before the first PDCCH; and
    wherein the device, in response to detecting only the first PDCCH among the first PDCCH and the second PDCCH, determines to start the timer based on a configuration parameter.

11. The device of claim 10, wherein the communication interface and processor further receive an indication from a network; where the indication enables a first data processing timeline, and change a value of the timer of the discontinuous reception cycle based on the first data processing timeline.

12. The device of claim 11, wherein the timer of the discontinuous reception cycle is a drx-ShortCycleTimer, and wherein the drx-ShortCycleTimer specifies a duration that a short DRX cycle is repeated in a time domain before transitioning to a long DRX cycle, conditioned on no transmissions being received when the drx-ShortCycleTimer is running, and the long DRX cycle comprises at least one short DRX cycle.

13. The device of claim 10, wherein the timer value is a discontinuous reception inactivity timer value used by the device.

14. The device of claim 10, wherein the communication interface and processor further start a HARQ round trip time timer used by the device, in response to the detecting, wherein the HARQ round trip time timer is set for a HARQ round trip timer value that specifies an amount of time between detecting the transmission and start a discontinuous reception retransmission timer used by the device that extends the active time by a discontinuous reception retransmission timer value; and wherein the discontinuous reception retransmission timer value is determined based on a first transmission time interval length from multiple transmission time interval lengths for which the device can be enabled, where the first transmission time interval length is associated with the detected transmission.

\* \* \* \* \*